(12) United States Patent
Kataoka et al.

(10) Patent No.: US 7,501,166 B2
(45) Date of Patent: Mar. 10, 2009

(54) LIQUID CRYSTAL PANEL AND MANUFACTURING METHOD THEREFOR

(75) Inventors: Shingo Kataoka, Kawasaki (JP); Hideo Chida, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 353 days.

(21) Appl. No.: 10/806,042

(22) Filed: Mar. 22, 2004

(65) Prior Publication Data

US 2005/0109985 A1    May 26, 2005

(30) Foreign Application Priority Data

Mar. 26, 2003   (JP)   ............... 2003-085220

(51) Int. Cl.
  *C09K 19/00*  (2006.01)
  *C09K 19/52*  (2006.01)

(52) U.S. Cl. ............... 428/1.3; 428/1.1; 252/299.01

(58) Field of Classification Search ............ 428/1.3, 428/1.1, 1.2; 252/299.01, 299.1–299.7; 430/270.1
See application file for complete search history.

(56) References Cited

U.S. PATENT DOCUMENTS

| | | | |
|---|---|---|---|
| 3,803,050 A | 4/1974 | Haas et al. | |
| 3,848,966 A | 11/1974 | Smith et al. | |
| 5,186,986 A | 2/1993 | Ogawa | |
| 5,307,190 A | 4/1994 | Wakita et al. | |
| 5,496,497 A | 3/1996 | Takiguchi et al. | |
| 5,725,915 A | 3/1998 | Ishitaka et al. | |
| 6,055,031 A | 4/2000 | Lowe | |
| 6,266,111 B1 | 7/2001 | Kataoka et al. | |
| 6,287,649 B1 | 9/2001 | Fukushima et al. | |
| 6,540,940 B1 | 4/2003 | Negoro et al. | |
| 6,801,286 B2 | 10/2004 | Yamaguchi et al. | |
| 6,819,375 B2 | 11/2004 | Wachi | |
| 6,858,423 B1 | 2/2005 | Abbott et al. | |
| 6,905,640 B2 | 6/2005 | Tanaka | |
| 2003/0231272 A1 | 12/2003 | Nakamura et al. | |
| 2004/0191428 A1* | 9/2004 | Tsuda et al. | ........ 428/1.3 |
| 2005/0109985 A1 | 5/2005 | Kataoka et al. | |

FOREIGN PATENT DOCUMENTS

| | | |
|---|---|---|
| EP | 0611981 | 2/1994 |
| JP | 02-047628 | 2/1990 |
| JP | 05-113557 | 5/1993 |
| JP | 5-71821 | 9/1993 |
| JP | 06-265858 | 9/1994 |
| JP | 06-289374 | 10/1994 |
| JP | 06-347795 | 12/1994 |
| JP | 08-015707 | 1/1996 |
| JP | 2000-122066 | 4/2000 |
| JP | 2002-080512 | 3/2002 |
| JP | 2002-148626 | 5/2002 |

* cited by examiner

*Primary Examiner*—Geraldina Visconti
(74) *Attorney, Agent, or Firm*—Greer, Burns & Crain, Ltd.

(57) ABSTRACT

A liquid crystal panel having a liquid crystal layer sandwiched between a pair of substrates is provided, wherein the liquid crystal layer includes a liquid crystal and a cross-linked resin, and the cross-linked resin includes a cross-linked structural part adhered to a liquid crystal layer contacting surface (adhered, cross-linked structural part) and a terminal part rising from the liquid crystal layer contacting surface (rising terminal part). Vertical alignment of the liquid crystal is realized at no voltage application even without help of an alignment control film.

37 Claims, 8 Drawing Sheets

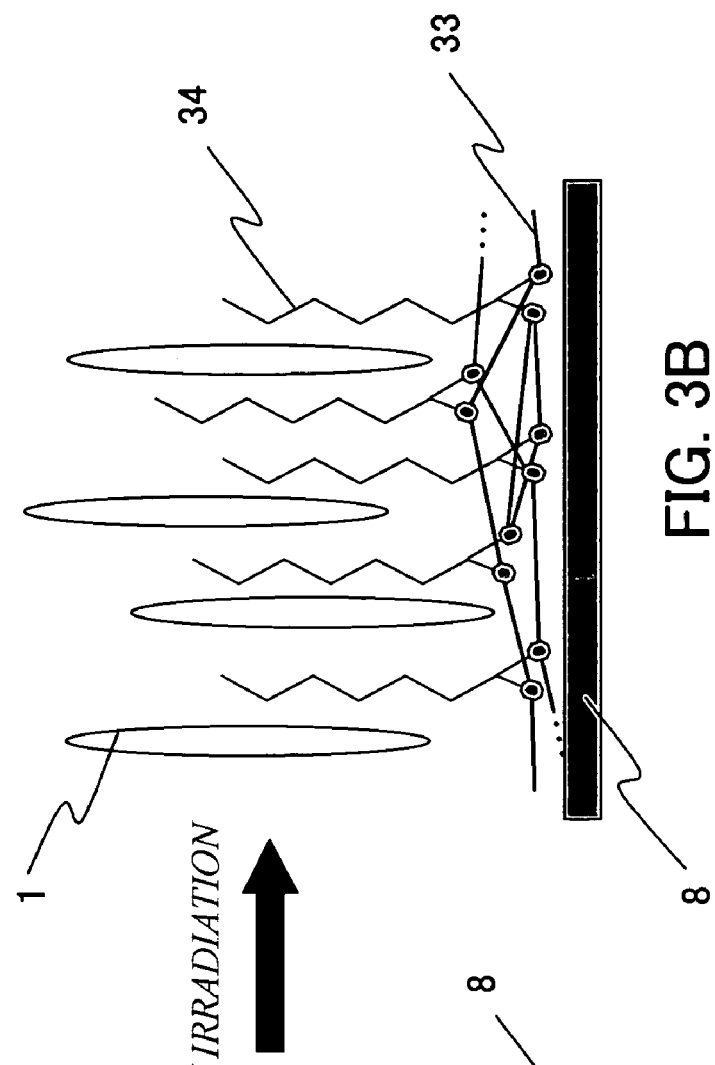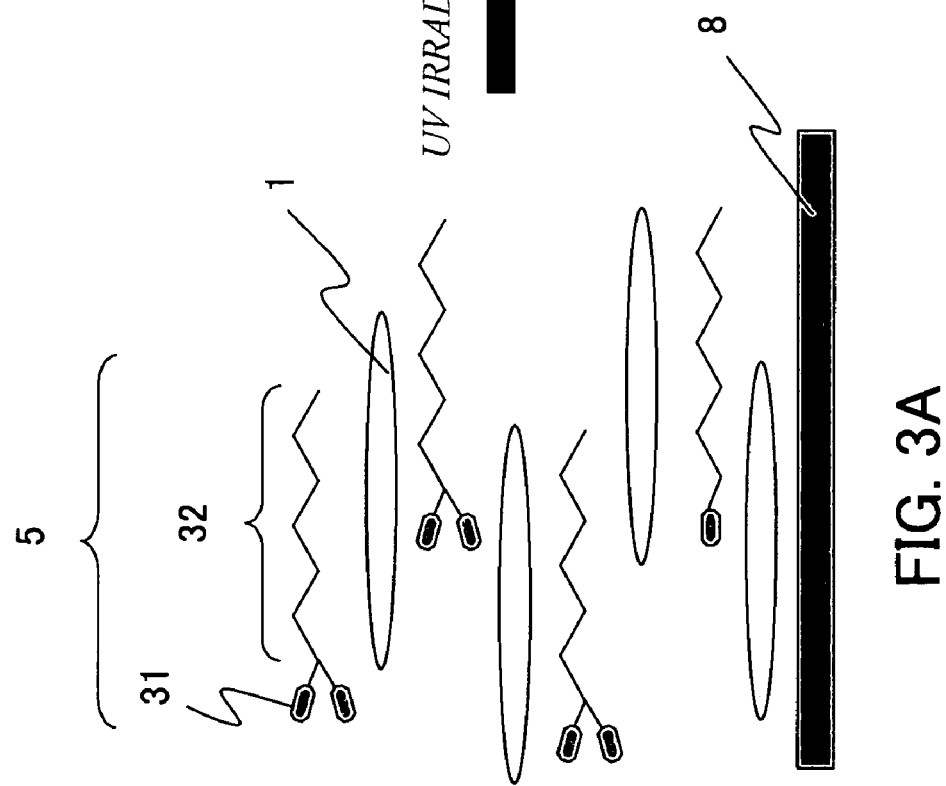

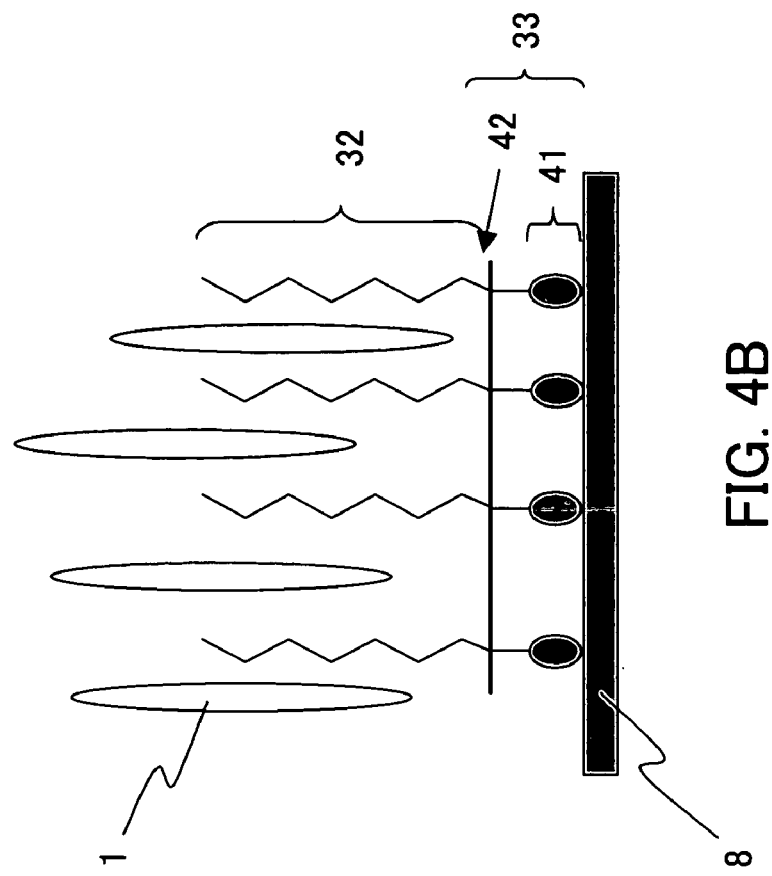
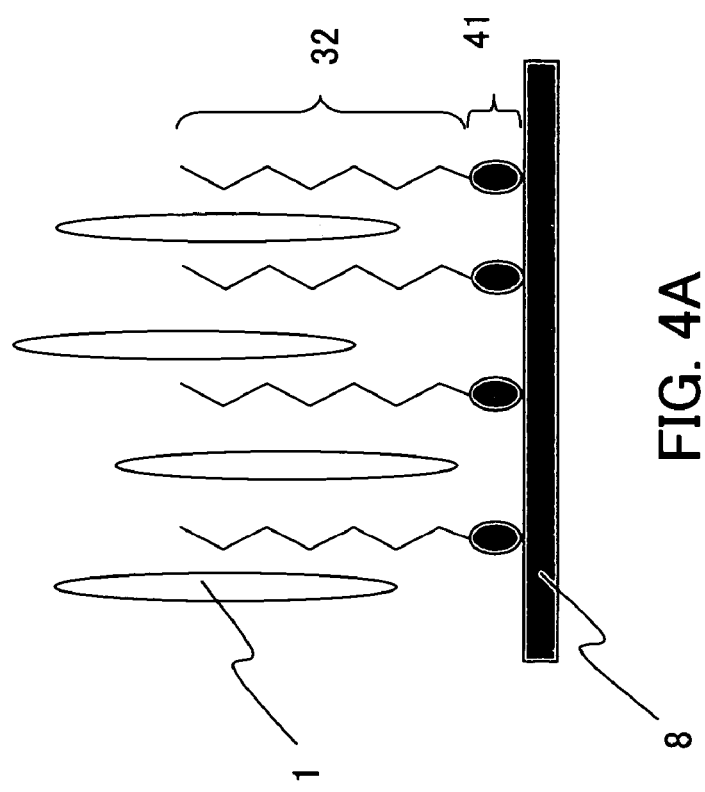

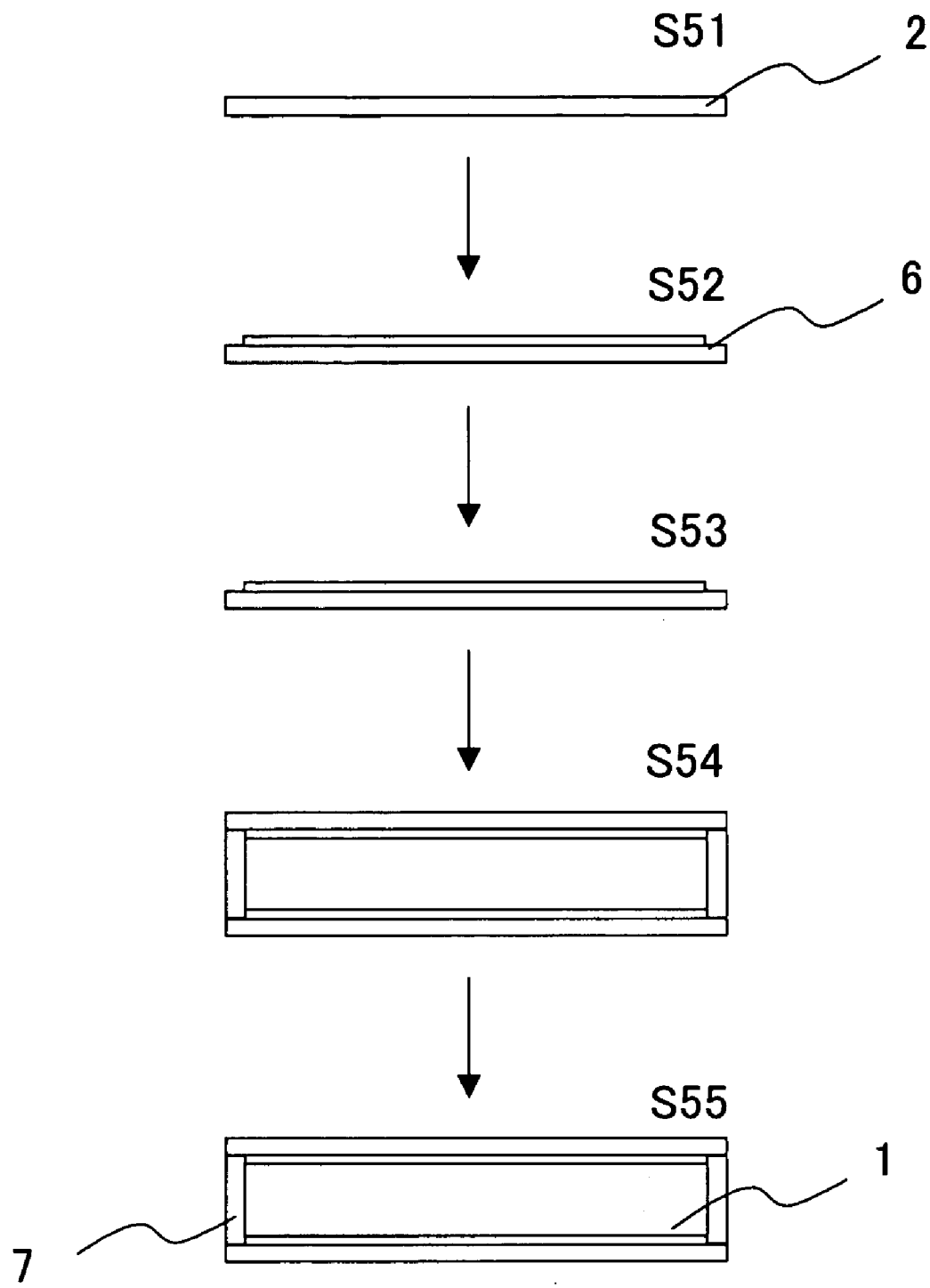

LIQUID CRYSTAL PANEL AND MANUFACTURING METHOD THEREFOR

BACKGROUND OF THE INVENTION

1. Field of the Invention

This invention relates to a liquid crystal panel. In particular, it relates to a liquid crystal panel utilizing a state in which a liquid crystal is vertically aligned when no voltage is applied.

2. Description of the Related Art

Liquid crystal displays have been developed rapidly and it seems they are substituting for substantial part of CRT (cathode ray tube) displays. From the top to the bottom in FIG. 5 illustrating a manufacturing method for a liquid crystal display panel that has been generally performed, first, a substrate 2 that has not an alignment control film coated thereon is prepared according to step S51, an alignment control film 6 composed of a polyimide, polyamic acid or the like is coated on the substrate 2 according to step S52, and then baking is performed according to step S53 followed by aligning treatment through rubbing. Thereafter, according to step S54, two such substrates are bonded together, and a liquid crystal 1 is introduced into the space according to step S55 to form a liquid crystal display panel.

For liquid crystal displays (LCD's) with an active matrix, liquid crystal panels according to the TN (twisted nematic) mode have been widely applied wherein liquid crystal materials having a positive dielectric constant anisotropy are aligned horizontally along the substrate surface and twisted at 90° between the two substrates that are facing each other. However, the TN mode entails, a problem of bad visual angle characteristics, and there have been various investigations conducted in order to improve them.

As a method substituting for this, there is the MVA (Multi-domain Vertical Alignment) system wherein a liquid crystal material having a negative dielectric constant anisotropy is vertically aligned when no voltage is applied, and the tilting direction of the liquid crystal at no voltage application is regulated by the uneven parts installed on the substrate surfaces and/or slits of an electrode or electrodes. This method has been successful in greatly improving the visual angle characteristics.

The explanations of liquid crystal panels according to the MVA system follow with examples in FIGS. 1A, 1B and FIG. 2. FIGS. 1A and 1B illustrate a model perspective view showing the alignment of a liquid crystal in a liquid crystal panel according to the MVA system, and FIG. 2 is a model plan view showing the alignment direction of a liquid crystal in a liquid crystal panel according to the MVA system.

In a liquid crystal panel according to the MVA system, a liquid crystal 1 having a negative dielectric constant anisotropy between two glass substrates is aligned vertically to the substrate surface as shown in FIG. 1 (A) at no voltage application. Pixel electrodes connected to TFT's (thin film transistors, not illustrated) are formed on a glass substrate 2, and a counter electrode is formed on the other glass substrate 3. Uneven parts 4 are formed alternately on the pixel electrodes and the counter electrodes, respectively.

When the TFT is off, that is, when no voltage is applied, the liquid crystal is aligned in a direction vertical to the substrate surface as shown in FIG. 1A, and when the TFT is on, that is, when voltage is applied, the liquid crystal is tilted towards the horizontal direction by the effect of the electric field, and the tilting direction of the liquid crystal 1 is regulated by the structure of the uneven parts. Accordingly, the liquid crystal molecules are aligned in plural directions in each pixel as shown in FIG. 1B. For example, molecules of the liquid crystal 1 are aligned, each, in directions A, B, C and D, when uneven parts 4 are formed as shown in FIG. 2.

Since it is not necessary for the MVA system to have an alignment control film in order to regulate the tilting direction of the liquid crystal, the aligning treatment process of an alignment control film represented by rubbing is not necessary, while it is almost always necessary in horizontal alignment systems such as the TN mode. This provides advantages in that the problems of static electricity and dusts in the rubbing process can be avoided, the cleaning steps after the aligning treatment can be eliminated, the problems of uneven alignment caused by fluctuation of the pretilt angle, etc. can be avoided, the facilities can be simplified owing to disuse of a printing machine for forming the alignment control film, baking furnace, etc., the processes can be simplified, the yield can be improved, and the production costs can be reduced. However, installation of the alignment control film is still needed in this MVA system.

Therefore, if the installation of the alignment control film can be avoided in the MVA system, there will be a lot of advantages including improved qualities of the liquid crystal, improved yield, simplified facilities, simplified processes, and low costs.

Furthermore, omission of the alignment control film is particularly advantageous in consideration of the present circumstances wherein superjumboization of the mother glass for substrates of liquid crystal panels has been developed rapidly, and it is becoming more and more difficult to have a printing machine for alignment control films corresponding to the size.

On the other hand, regarding technologies for enhancing the alignment properties of a liquid crystal, there are a liquid crystal existing as independent particles in a ionizing radiation-cured resin matrix (for example, see Japanese Unexamined-Patent Application Publication No. 5-113557, claims), a polymerizable monomer having an alkyl side chain being cured with a liquid crystal (for example, see Japanese Unexamined Patent Application Publication No. 6-265858, claims), a polymeric network structure-coated layer (for example, see Japanese Unexamined Patent Application Publication No. 6-289374, claims), a liquid crystal material in which a photopolymerizable acrylate having a liquid crystal skeleton structure is included (for example, see Japanese Unexamined Patent Application Publication No. 8-15707, claims), etc. However, it is believed that the question on omission of the alignment control film has been still unanswered.

SUMMARY OF THE INVENTION

It is an object of the present invention to solve the above-described problems and to provide a technology for the omission of an alignment control film that has been considered indispensable. Other purposes and advantages of the present invention will become clear by the explanations below.

According to one aspect of the present invention, a liquid crystal panel is provided that has a liquid crystal layer sandwiched between a pair of substrates, wherein the liquid crystal layer comprises a liquid crystal and a cross-linked resin, and the cross-linked resin comprises a cross-linked structural part adhered to a liquid crystal layer contacting surface (adhered, cross-linked structural part) and a terminal part rising from the liquid crystal layer contacting surface (rising terminal part).

It is preferable that the liquid crystal layer is formed by cross-linking, in the presence of a liquid crystal, a resin composition comprising one or more first compounds having a cross-linkable structural part, and a hydrophobic terminal part with a straight-chain section having three or more carbon atoms (hydrophobic, long-chain terminal part), that the cross-linkable structural part of the first compound(s) comprises a polar-group structural part, that the polar-group structural part does not generate impurity ions, that the amount of the resin composition in the liquid crystal layer is in the range of from 0.1 to 10% by weight, that the amount of the hydrophobic, long-chain terminal part is in the range of from 50 to 95 moles based on 100 moles of the first compound(s), that the liquid crystal has a negative dielectric constant anisotropy, that the cross-linking is performed by an active energy ray, that the hydrophobic, long-chain terminal part has an alkyl or alkoxy group having from 6 to 18 carbon atoms, that the cross-linkable structural part of the first compound(s) has two or more polymerizable double bonds per molecule, particularly that at least one compound represented by formula (1) or (2) below is included as the first compound(s),

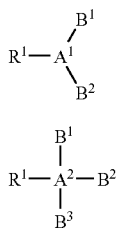

(in formulae (1) and (2), $R^1$ is a hydrophobic, long-chain terminal part; $A^1$ is a trivalent group comprising an aliphatic chain that may be branched, an aromatic ring that may have a substituting group, an alicyclic ring that may have a substituting group, or nitrogen; $A^2$ is a tetravalent group comprising an aliphatic chain that may be branched, an aromatic ring that may have a substituting group, or an alicyclic ring that may have a substituting group; $B^1$, $B^2$ and $B^3$ are, each, a cross-linkable structural part; and $R^1$, $B^1$, $B^2$ and $B^3$ can be selected independently from each other.), that the cross-linkable structural part of the first compound(s) contains at least one benzene ring structure bonded to a polymerizable group directly or via a carbon atom, that the one or more first compounds comprise a second compound with a cross-linkable structural part and substantially without a hydrophobic, long-chain terminal part, that the second compound comprises at least one aromatic ring and at least one carbonyl group, respectively, particularly that at least one compound selected from the group consisting of the compounds represented by formulae (3) to (6) below is included as the second compound,

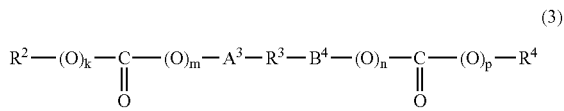

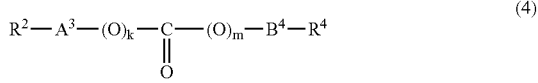

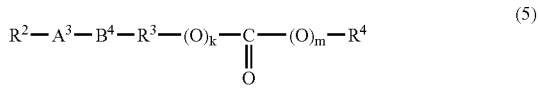

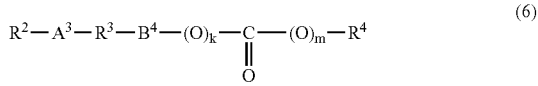

(in formulae (3) to (6), $A^3$ and $B^4$ are, independently from each other, a vinylene group or a propenylene group; $R^3$ is a divalent group; $R^2$ and $R^4$ are, independently from each other, hydrogen, an alkyl group that may be branched or an aromatic ring that may be substituted; at least one of $R^2$, $R^3$ and $R^4$ is an aromatic ring; k, m, n and p are, independently from each other, 0 (zero) or 1; and $R^2$-$R^4$, $A^3$, $B^4$, k, m, n and p can be selected independently from each other), that the second compound comprises a five-member ring structure, that the five-member ring structure in the second compound is an acid anhydride structure or an imide structure, particularly that at least one compound selected from the group consisting of the compounds represented by formulae (7) to (10) below is included as the second compound,

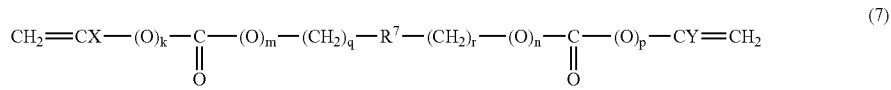

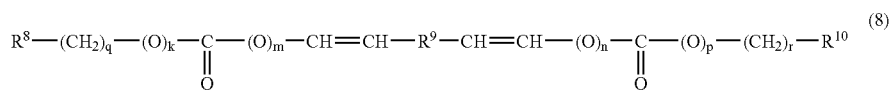

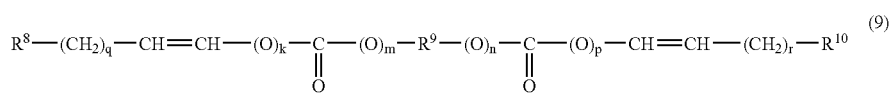

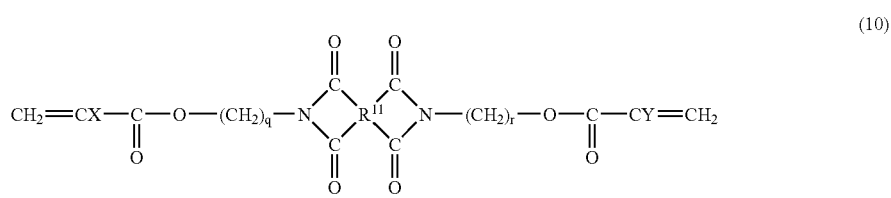

(in formulae (7) to (10), X and Y are, each independently, hydrogen or a methyl group; $R^7$ is a divalent organic group having a five-member ring structure; $R^8$ and $R^{10}$ are hydrogen or an organic group; $R^9$ is a divalent organic group; at least one of $R^8$, $R^9$ and $R^{10}$ has a five-member ring structure; $R^{11}$ is a tetravalent organic group constituting a tetracarboxylic acid residue; k, m, n and p are, independently from each other, 0 (zero) or 1; q and r are, independently from each other, an integer not less than 0 (zero) and not more than 6; and $R^8$-$R^{10}$, k, m, n, p, q and r can be selected independently from each other), that the liquid crystal tilts while the tilting direction is regulated by uneven parts or the blank parts (slits) of an electrode or electrodes when voltage is applied, and that the panel does not have an alignment control film, etc.

According to another aspect of the present invention, a method for manufacturing a liquid crystal panel having a liquid crystal layer sandwiched between a pair of substrates, wherein a resin composition comprising one or more first compounds having a cross-linkable structural part and a hydrophobic terminal part with a straight-chain section having three or more carbon atoms (hydrophobic, long-chain terminal part), is cross-linked in the presence of a liquid crystal to form the liquid crystal layer so that a cross-linked resin in the liquid crystal layer thus formed is made to comprise a cross-linked structural part adhered to the liquid crystal layer contacting surface (adhered, cross-linked structural part) and a terminal part rising from the liquid crystal layer contacting surface (rising terminal part) is provided.

It goes without saying that it is also possible to apply the preferable aspects of the above-described liquid crystal panel according to the present invention to this aspect of the present invention, regarding the liquid crystal, hydrophobic, long-chain terminal part, adhered, cross-linked structural part, polar-group structural part, cross-linking, cross-linkable structural part, cross-liked resin, resin composition, first compound(s), second compound, third compound, uneven parts, slits of an electrode or electrodes, alignment control film, etc.

By the present invention, a liquid crystal can be vertically aligned at no voltage application even without help of an alignment control film. In particular, an alignment control film forming step can be omitted in the vertically alignment systems represented by the MVA system.

BRIEF DESCRIPTION OF THE DRAWINGS

FIG. 3A is a model view illustrating the basic principle of the present invention;

FIG. 3B is another model view illustrating the basic principle of the present invention;

FIG. 4A is a model view illustrating an adhered, cross-linked structural part comprising a polar-group structural part;

FIG. 4B is another model view illustrating an adhered, cross-linked structural part comprising a polar-group structural part;

FIG. 5 is a flow chart illustrating an outline of a method for manufacturing a liquid crystal display panel;

DESCRIPTION OF THE PREFERRED EMBODIMENTS

Figure 1:
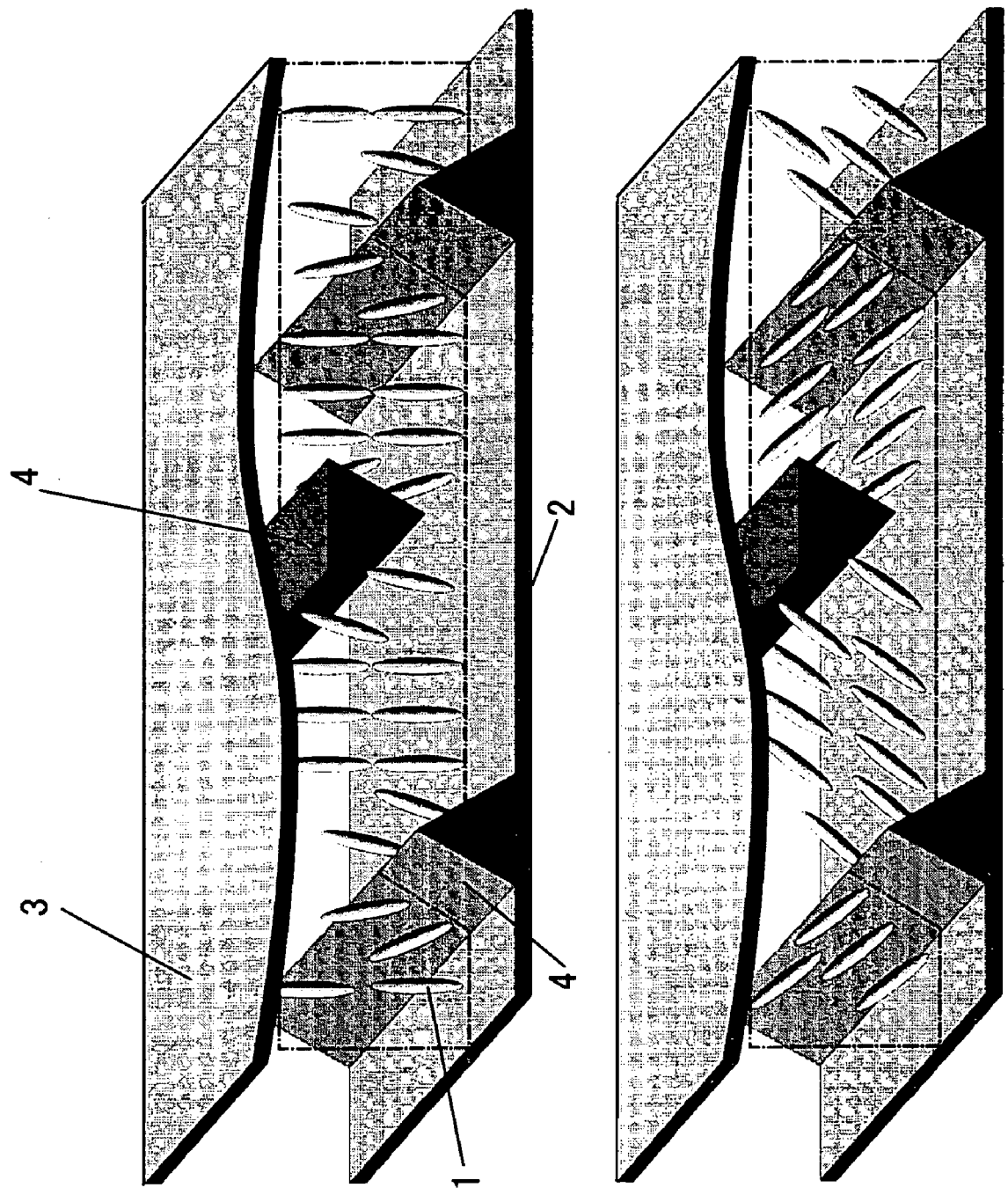
FIG. 1A illustrates a model perspective view showing the alignment of a liquid crystal, in a liquid crystal panel according to the MVA system.
FIG. 1B illustrates another model perspective view showing the alignment of a liquid crystal in a liquid crystal panel according to the MVA system.

Embodiments according to the present invention will be described with reference to the following figures, formulae, examples, etc. It is to be understood that these figures, formulae, examples, etc., plus the explanations below are for the purpose of illustrating the present invention, and do not limit the scope of the present invention. It goes without saying that other embodiments should also be included in the category of the present invention as long as they conform to thee gist of the present invention. In the figures, the same sign indicates the same element. It is to be noted that the "structural part" in this specification indicates, when, for example, a polar-group structural part is referred to, a part having a polar group. In other words, the "structural part" may also include chemical structures other than a polar group. For example, when a polar group is COOH, $CH_2COOH$ can be considered a polar-group structural part. This "structural part" may be located at the end section or at an intermediate section of a molecule or cross-linked material. For example, $CH_2OCO$— can also be included in a polar-group structural part. In contrast, the "terminal part" means a part constituting the end section of a molecule or cross-linked material.

In a liquid crystal panel according to the present invention, a liquid crystal layer sandwiched between a pair of substrates comprises a liquid crystal and a cross-linked resin, and this cross-linked resin has a cross-linked structural part adhered to the liquid crystal layer contacting surface (adhered, cross-linked structural part) and a terminal part rising from the liquid crystal layer contacting surface (rising terminal part). It is considered that this cross-linked resin plays a role of regulating the director direction of a liquid crystal, whereby a liquid crystal is aligned in the vertical direction when no voltage is applied.

To be concrete, it is considered that a hydrophobic, long-chain terminal part that will be described later is bonded to the adhered, cross-linked structural part so as to have a structure in which the hydrophobic, long-chain terminal part rises from the liquid crystal layer contacting surface, whereby the liquid crystal is aligned in the vertical direction when no voltage is applied.

This cross-linked resin can be formed by cross-linking, in the presence of a liquid crystal, a resin composition comprising one or more compounds having a cross-linkable structural part and a structural part with a certain level of chain length. To be more concrete, it is preferable to use, as the above-described compound, one or more first compounds having a cross-linkable structural part and a hydrophobic terminal part with a straight-chain section having three or more carbon atoms (hydrophobic, long-chain terminal part).

In such a case, it is possible to determine whether the adhered, cross-linked structural part is realized or not, by determining, through a surface analysis or the like, whether cross-linking adhered onto the liquid crystal layer contacting surface exists or not when polymerization with cross-linking has actually occurred. The level of adhesion can be determined arbitrarily according to the actual level of displaying performance as required for a liquid crystal panel.

Whether a structure where a structural part having a certain level of chain length will rise from the liquid crystal layer contacting surface is realized or not, can be determined by whether alignment of a liquid crystal is shown without an alignment control flow when a liquid crystal panel is actually prepared. The required level of alignment can be arbitrarily chosen according to the practices. The first compound(s) having a hydrophobic, long-chain terminal part often serves for realizing such alignment.

In the present invention, it is stipulated that a liquid crystal layer includes a liquid crystal and a cross-linked resin. However, among constituents of the cross-linked resin, the adhered, cross-linked structural part is located on the liquid crystal layer contacting surface, and the rising terminal part is located in the vicinity of the adhered, cross-linked structural part. Accordingly, it may sometimes be possible to consider that the cross-linked resin forms a layer distinct from the liquid crystal. While the cross-linked resin is generally formed on the liquid crystal layer contacting surfaces on both sides of the liquid crystal layer, it is also possible, in many cases, to regard the liquid crystal layer as being composed of two types of layers: a layer mainly comprising a liquid crystal and a layer or layers made of a cross-linked resin.

For example, when this cross-linked resin is formed by cross-linking, in the presence of a liquid crystal, a resin composition comprising one or more compounds having a cross-linkable structural part and a structural part having a certain level of chain length, the resin composition is in a state in which it is uniformly mixed with a liquid crystal prior to the cross-linking, while after a cross-linked resin has been formed, a state in which the cross-linked resin and the liquid crystal are mostly separated from each other, can occur. However, the present invention may also include embodiments wherein other types of cross-linked resins coexist in the liquid crystal.

Here, the above-described first compound(s) is not limited to the case in which one molecule has both a cross-linkable structural part and a hydrophobic, long-chain terminal part, but may also be a mixture of a compound having a cross-linkable structural part and a compound having a hydrophobic, long-chain terminal part.

It is preferable that the adhered, cross-linked structural part has a polar-group structural part, since the adhered, cross-linked structural part sticks to the liquid crystal layer contacting surface more strongly when a polar-group structural part is present. The term "polar-group structural part" for the cross-linked resin is used in the same meaning as for the above-described first compound(s). The detail will be explained later.

As a cross-linkable structural part, exemplified is a structural part having a photoreactable group that has a polymerizable double bond such as an acrylate group, a methacrylate group, a vinyl group and an allyl group, and that is polymerizable with other molecules by an active energy ray such as UV radiation. When the cross-linkable structural part of the first compound(s) has two or more polymerizable double bonds in a molecule, the reactivity will be enhanced and a network-structure polymer film can be formed from a single compound, so that a cross-linked structure is easily formed. Accordingly, this is preferable. A case in which one compound has polymerizable double bonds at two or more end sections of one molecule or in the vicinity can be exemplified. However, the requirement for a first compound(s) is satisfied if the whole of the "one or more first compounds" has a cross-linkable structural part, and accordingly, compounds containing a compound having one polymerizable double bond in a molecule that can only extend the polymeric chain and lacks an ability of its own to cross-link, can also be included in the category of the "one or more first compounds having a cross-linkable structural part", for example.

As a cross-linkable structural part according to the present invention, one that is cross-linkable with an active energy ray is preferable, since the cross-linked structure is easily realized. Accordingly, explanation is mainly made to a structure having a photofunctional group. However, it goes without saying that those that can be cross-linked by the other kinds of energy such as the other types of active energy rays and heat, can also be included in the category of the present invention. They may be used together.

The hydrophobic, long-chain terminal part plays a role of aligning a liquid crystal uniformly in the longitudinal direction of the hydrophobic, long-chain terminal part. When it has a straight chain section having three or more carbon atoms, the role will be more evident. More preferably, the hydrophobic, long-chain terminal part has an alkyl or alkoxy group with 6-18 carbons. Still more preferably, it has an alkyl or alkoxy group with 12-18 carbons. The term "hydrophilic" means a state in which there are no polar groups or similar groups, or chemically a state on the level of "not hydrophilic".

The liquid crystal layer contacting surface such as a substrate surface is usually subjected to a UV treatment or the like to give hydrophilic properties. The hydrophobic properties are required so as to prevent the hydrophobic, long-chain terminal part from sticking to the hydrophilic liquid crystal layer contacting surface, and accordingly, to make easy the hydrophobic, long-chain terminal part rise from the liquid crystal layer contacting surface. Typically, the hydrophobic, long-chain terminal part is preferably composed of carbon and hydrogen.

When the cross-linkable structural part of the first compound(s) comprises a polar-group structural part, adhesion of the adhered, cross-linked structural part to the liquid crystal layer contacting surface is easy and better alignment of a liquid crystal is realized. To achieve the purpose, there is no particular limitation to the type of the polar group and the number of the polar group per molecule. It is also important for the cross-linked resin after the cross-linking of the resin composition not to emit impurity ions into the liquid crystal so that the reliability of the liquid crystal panel is maintained. For this purpose, it is preferable that the polar-group structural part in the cross-linkable structural part of the first compound(s) does not generate impurity ions. Therefore, in many cases, it is preferable to avoid those having functional groups such as an —$SiCl_3$ group that tend to generate Cl ions. As a preferable polar group, CN, CO, COOH, COOR, OH and OR are enumerated. It is to be noted that R means an organic group, here.

This liquid crystal panel can be manufactured as follows, for example. First, two substrates on which alignment control films have not been applied are prepared. A liquid crystal layer comprising, for example, a UV-curable compound with a structural part having a photoreactive group and a hydrophobic, long-chain terminal part as well as a liquid crystal is sandwiched between them, and then, UV curing is performed to form on the substrate surfaces an adhered, cross-linked structural part bonded to a hydrophobic, long-chain terminal part.

FIGS. 3A and 3B illustrate the basic principle of the present invention. Immediately after the introduction of an uncured liquid crystal composition comprising a liquid crystal and a resin composition, a first compound(s) 5 having a cross-linkable structural part 31 and a hydrophobic, long-chain terminal part 32, and a liquid crystal 1 are in the horizontally aligned state along the liquid crystal layer contacting surface 8, as shown in FIG. 3A. Nothing is formed on the surface of the liquid crystal layer contacting surface 8.

Here, it is to be noted that the "liquid crystal layer contacting surface" according to the present invention does not necessarily mean the surface of a simple substrate. It means the surface of a layer that the liquid crystal layer actually contacts. For example, when a substrate and a liquid crystal layer are laminated with a filter layer in between, and the liquid crystal layer actually contacts the surface of the filter, but not the surface of the substrate, the "liquid crystal layer contacting surface" according to the present invention means the surface of the filter that the liquid crystal contacts. If the surface of the filter has been subjected to a treatment to give hydrophilicity, the treated surface is the liquid crystal layer contacting surface.

It was found that when UV irradiation for example was performed in this state, as shown in FIG. 3B, cross-linkable structural parts 31 are cross-linked with one another to form an adhered, cross-linked structural part 33, hydrophobic, long-chain terminal parts 32 have a configuration of rising from the liquid crystal layer contacting surface 8 to form rising terminal parts 34.

Figure 6:
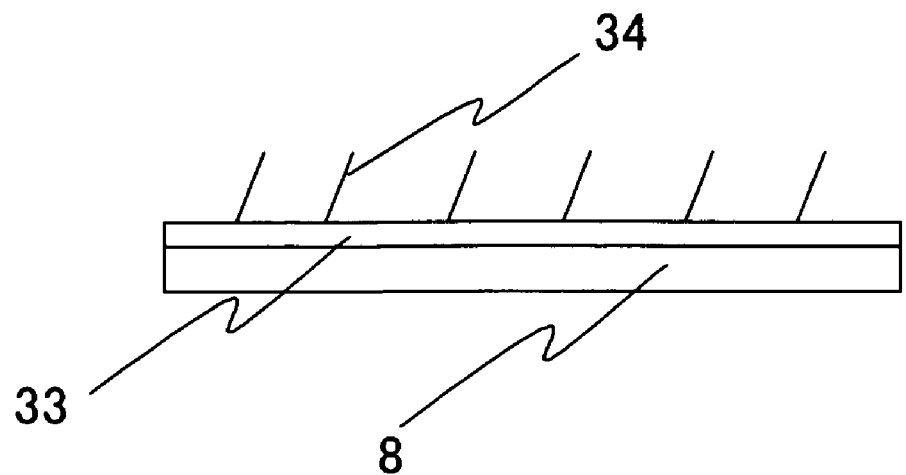
FIG. 6 is a model side view of a liquid crystal layer contacting surface.
Figure 7:
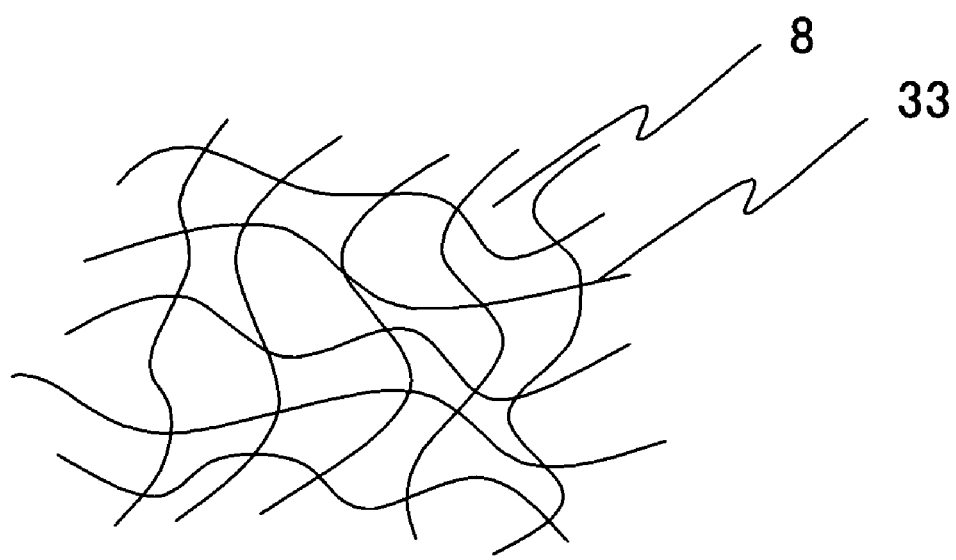
FIG. 7 is a top view of a liquid crystal layer contacting surface.

FIGS. 6 and 7 are model views further illustrating this state. FIG. 6 is a model side view of a liquid crystal layer contacting surface, and FIG. 7 is a top view. FIG. 6 shows a state in which the adhered, cross-linked structural part 33 adheres to the liquid crystal layer contacting surface 8, and the rising terminal parts 34 are rising. FIG. 7 shows a state in which the adhered, cross-linked structural part 33 forms an intertwined network structure that is adhered to the liquid crystal layer contacting surface 8.

It can be easily, confirmed that the adhered, cross-linked structural part 33 actually adheres to the liquid crystal layer contacting surface, by taking out the liquid crystal layer contacting surface, performing cleaning or the like, and then, analyzing the surface. Furthermore, it can be easily confirmed that the rising terminal parts 34 are actually rising, by the fact that the liquid crystal 1 shows vertical alignment. Accordingly, it is possible to align the liquid crystal 1 vertically when no voltage is applied.

In the alignment by this constitution, it cab be considered that distinctly different from the conventional, so-called polymer dispersion liquid crystal (PDLC), a polymer for making the alignment of the liquid crystal possible, is not formed all over the liquid crystal layer, and the alignment is controlled by the cooperative actions of the thin-film, adhered, cross-linked structural part 33 formed on the liquid crystal layer contacting surface, and the rising terminal parts 34. It is to be noted that usually, both of the two liquid crystal layer contacting surfaces have thin-film, adhered, cross-linked structural parts 33.

To be concrete, it is preferable that the first compound(s) for use in the present invention comprises at least one compound represented by the above-described formula (1) or (2). In the formulae (1) and (2), $R^1$ is a hydrophobic, long-chain terminal part; $A^1$ is a trivalent group comprising an aliphatic chain that may be branched, an aromatic ring that may have a substituting group, an alicyclic ring that may have a substituting group, or nitrogen; $A^2$ is a tetravalent group comprising an aliphatic chain that may be branched, an aromatic ring that may have a substituting group, or an alicyclic ring that may have a substituting group; $B^1$, $B^2$ and $B^3$ are, each, a cross-linkable structural part; and $R^1$, $B^1$, $B^2$ and $B^3$ can be selected independently, in the formulae as well as in the other formulae.

As a compound represented by formula (1), materials having the structures represented by formulae (11)-(13) below are exemplified.

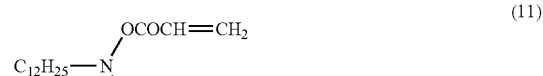

(11)

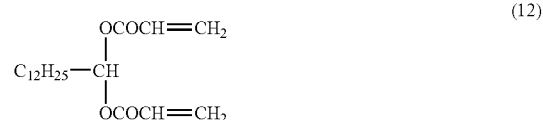

(12)

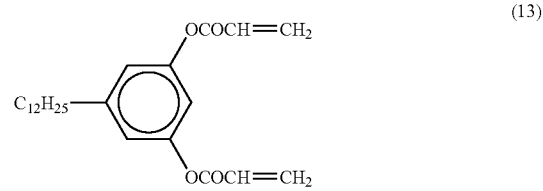

(13)

As a compound represented by formula (2), materials having the structures represented by formulae (14) and (15) below are exemplified.

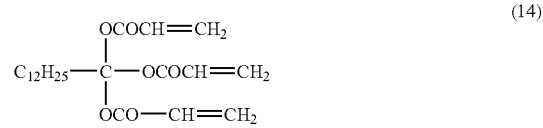

(14)

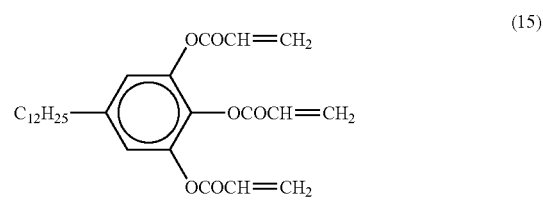

(15)

Taking compounds represented by formulae (1), (2), and (11)-(15) for example, explanations will be made on the cross-linkable structural part, adhered, cross-linked structural part, rising terminal part, hydrophobic, long-chain terminal part and polar-group structural part as described heretofore. $B^1$, $B^2$ and $B^3$ are cross-linkable structural parts and have an ability to form an adhered, cross-linked structural part, $R^1$ forms a rising terminal part or hydrophobic, long-chain terminal part, and the OCO (or COO) bond forms a polar-group structural part.

Furthermore, as a compound in which the cross-linkable structural part includes a polar-group structural part, materials having structures represented by formulae (16) and (17) below are exemplified. In such a case, COOH or the like forms a polar-group structural part.

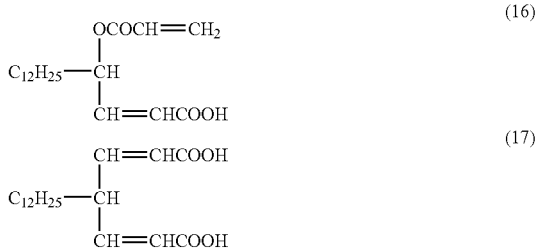

(16)

(17)

It is preferable that the cross-linkable structural part of the first compound(s) has a benzene ring introduced in the vicinity of a polymerizable group such as a polymerizable double bond, in order to facilitate the reaction of the first compound(s) with ultraviolet rays or the like. To be more specific, it is desirable that it has at least one benzene ring structure bonded to a polymerizable group directly or via a carbon atom. A benzene ring has a photosensitizing action. It also serves to improve the alignment properties. Furthermore, materials excellent in solubility in a liquid crystal can be easily obtained owing to the enhanced similarity of the structure to the structure of the liquid crystal. Materials having structures represented by formulae (18) and (19) below exemplify such a material.

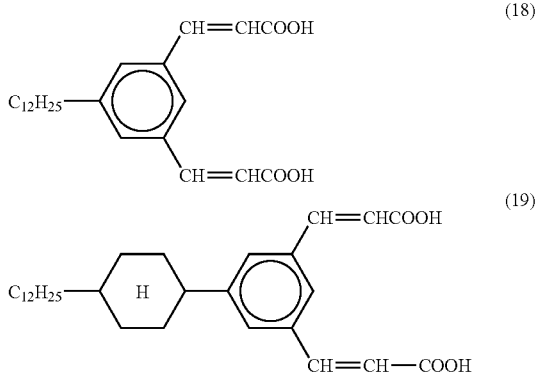

(18)

(19)

In the above, combination of an alkyl chain and a carboxylic acid group is shown as a hydrophobic, long-chain terminal part and polar-group structural part. However, it is to be noted that the present invention is not limited to this, and it goes without saying that other chemical structures can also be employed.

Here, the present invention is explained in relation with a case in which an adhered, cross-linked structural part has a polar-group structural part. A cross-linked resin is conventionally known that forms a state in which polar-group structural parts 41 or parts in a material having a high polarity are adsorbed onto the liquid crystal layer contacting surface 8, and hydrophobic, long-chain terminal parts 32 are aligned as rising in the vertical direction to the liquid crystal layer contacting surface 8 as shown in FIG. 4A. In this stage, it is possible to align the liquid crystal in the direction vertical to the substrate surface. However, this state is thermally unstable, and the dissociation from the liquid crystal layer contacting surface tends to occur.

As a result of investigations, it was found that the dissociation from the liquid crystal layer contacting surface can be effectively prevented and the thermal stability can be improved by making the adhered, cross-linked structural part 33 in FIG. 3B have a polar-group structural part. In this case, there is no particular limitation to the locational relationship regarding where the adhered, cross-linked structural part 33 and the polar-group structural part are located, and an appropriate material can be determined, taking into consideration the ease of material procurement, dissociation prevention from the liquid crystal layer contacting surface, etc. In a typical example, as shown in FIG. 4B, when a structure is realized in which the cross-linked structural part 42 of the adhered, cross-linked structural part 33 is sandwiched by the hydrophobic, long-chain terminal part 32 and the polar-group structural part 41, the cross-linked structural part 42 of the adhered, cross-linked structural part 33 is probably formed as a film (thin film), so that a stabler function to control the alignment is realized.

When such a structure is realized, a stable control of alignment of a liquid crystal on the same level as the one for which an alignment control film is employed, is made possible, without treatments such as printing of an alignment control film which has been conventionally used for aligning a liquid crystal.

The first compound(s) having the structure described above may be used not only singly, but also as a mixture of a plural number of compounds. Other materials such as a cross-linking agent, catalyst and reaction accelerator may be used together.

There are cases in which it is preferable that the one ore more first compounds include a second compound with a cross-linkable structural part and substantially without a hydrophobic, long-chain terminal part. For example, by having a second compound together that has only a cross-linkable structural part with a plurality of polymerizable groups in a molecule and does not have a hydrophobic, long-chain terminal part, it is possible to realize a state in which the mutual distances between the rising terminal parts rising from the adhered, cross-linked structural part that is adhered to the liquid crystal layer contacting surface are made wider, and accordingly, to improve the vertical alignment of the liquid crystal. In particular, widening of the mutal distances is useful when an alkyl group is used for the rising terminal part, because alkyl groups tend to be adsorbed by each other. A plural number of second compounds may be used.

Whether it does not have hydrophobic, long-chain terminal parts substantially, can be appropriately determined by seeing whether the mutual distances between the rising terminal parts can be widened, and accordingly, the vertical alignment of the liquid crystal is enhanced or the like. A simple group such as a methyl group and an ethyl group is not regarded as a hydrophobic, long-chain terminal part, in general.

Furthermore, it is possible to have other agents such as an ion trapping agent that plays a role of increasing the reliability together, or to make the first compound(s) according to the present invention have this role. In this way, the choice range for the first compound(s) can be greatly widened.

It is preferable for the second compound to have at least one aromatic ring and at least one carbonyl group, respectively. In this way, adhesion to the liquid crystal layer contacting surface becomes stronger.

Compounds represented by the above-described formulae (3)-(6) exemplify such a second compound. In formulae (3)-(6), $A^3$ and $B^4$ are, independently from each other, a vinylene group or a propenylene group; $R^3$ is a divalent group; $R^2$ and $R^4$ are, independently from each other, hydrogen, an alkyl group that may be branched or an aromatic ring that may be substituted; at least one of $R^2$, $R^3$ and $R^4$ is an aromatic ring; k, m, n and p are, independently from each other, 0 (zero) or 1; and $R^2$-$R^4$, $A^3$, $B^4$, k, m, n and p can be selected independently from each other, in the formulae as well as in the other formulae.
Here, the divalent group ($R^3$) described above is, for example, a methylene group, a 1,4-phenylene group, a 4,4'-biphenylene group or the like. Those shown below are the examples.
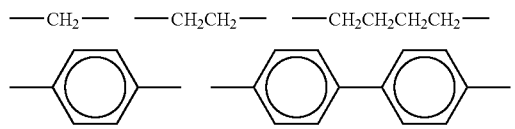
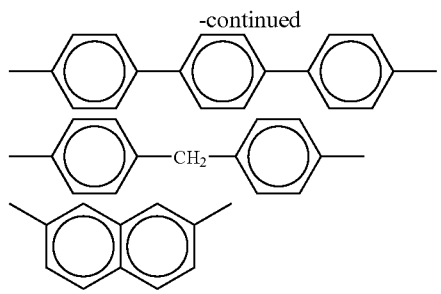
Examples of compounds represented by formulae (3)-(6) are shown below.
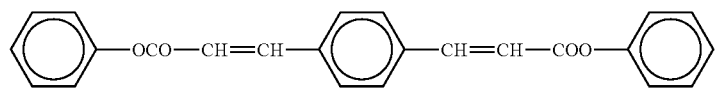
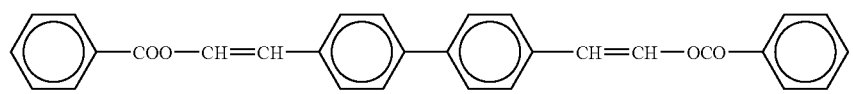
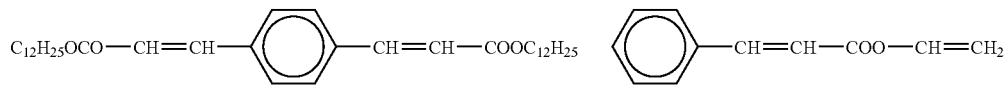
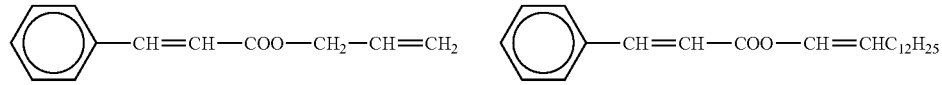
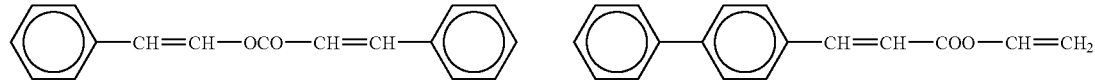
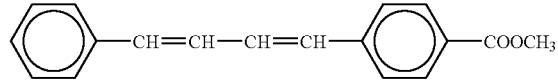
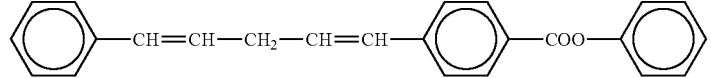
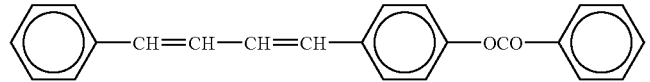
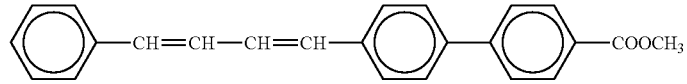
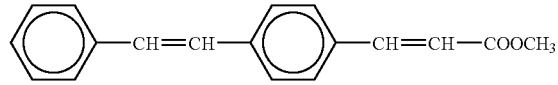
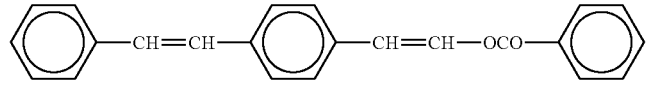
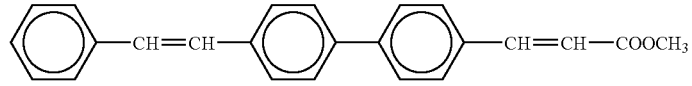

It is also preferable that the second compound has a five-member ring structure. As a five-member ring structure, cyclopentane, cyclopentene, cyclopentadiene, furan, pyrrole, indene, an acid anhydride structure such as succinic anhydride, maleic anhydride and phthalic anhydride, and an imide structure such as succinimide, maleimide and phthalimide, are enumerated. To be concrete, those shown below are examples of the compounds having the above-described structures. It is to be noted that the locations of substituting groups are not limited to those exemplified below.

As a second compound, compounds represented by the above-described formulae (7)-(10) are exemplified. In formulae (7)-(10), X and Y are, each independently, hydrogen or a methyl group; $R^7$ is a divalent organic group having a five-member ring structure; $R^8$ and $R^{10}$ are hydrogen or an organic group; $R^9$ is a divalent organic group; at least one of $R^8$, $R^9$ and $R^{10}$ has a five-member ring structure; $R^{11}$ is a tetravalent organic group constituting a tetracarboxylic acid residue; k, m, n, and p are, independently from each other, 0 (zero) or 1; q and r are, independently from each other, an integer not less than 0 (zero) and not more than 6; and $R^8$-$R^{10}$, k, m, n, p, q and r can be selected independently from each other, in the formulae as well as in the other formulae.

Examples of the compounds represented by formulae (7)-(10) are shown below.

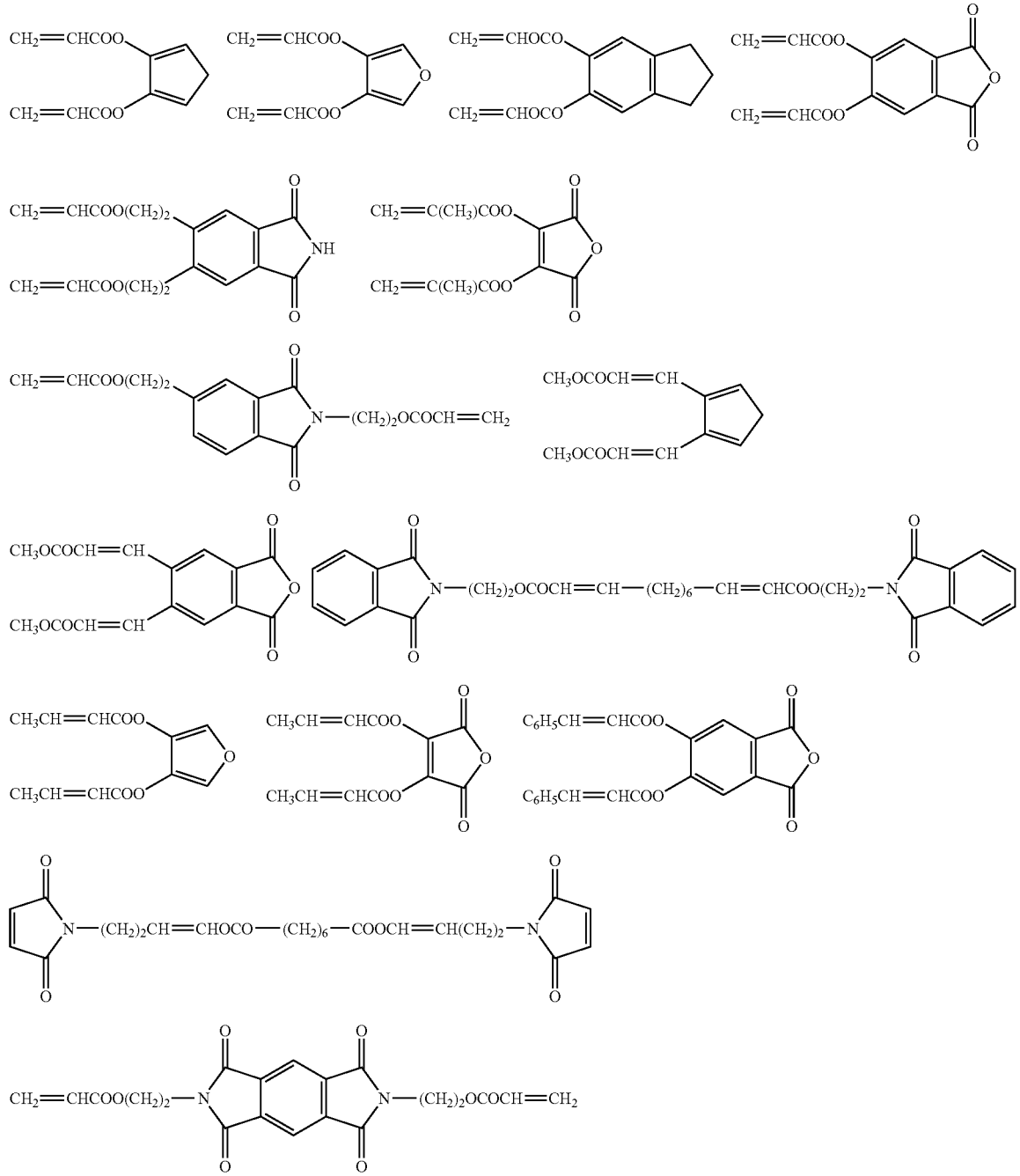

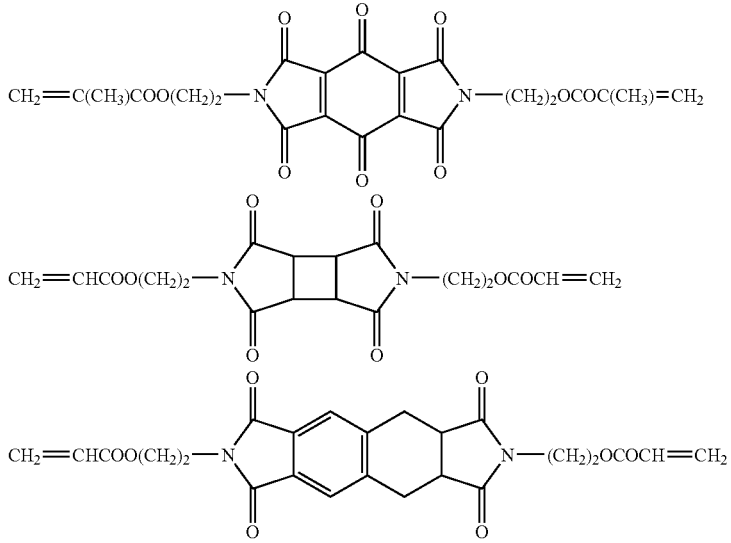

When compounds represented by formulae (3)-(10) are used, they react with less energy due to the resonance stabilization. That is, they are more easily reactable, compared with compounds without an aromatic ring, a carbonyl group or a five-member ring. In addition, the amount of an added polymerization initiator can be reduced by virtue of this. This reduction can lead to improved reliability of the liquid crystal panel. For example, if a large amount of an added polymerization initiator is applied, there will be more chance of generating reaction by-products with smaller molecular weights. Accordingly, a smaller amount of an added polymerization initiator is desirable.

As the second compound has a cross-linkable structural part and substantially lacks a hydrophobic, long-chain terminal part, it is preferable to use a third compound having one polymerizable group as well as a hydrophobic, long-chain terminal part together with the second compound. This is because the hydrophobic, long-chain terminal part can constitute rising terminal parts. A plurality of the third compounds may be used.

As the third compound, the following compound can be used, for example.

When those having such a long-chain alkyl group are used, the alkyl group parts extend from the plane of the adhered, cross-linked network-structure part, and accordingly, the liquid crystal indicates vertical alignment. Therefore, using a compound represented by formula (3), (4), (5), (6), (7), (8), (9) or (10) for mixing, using a liquid crystal having a negative dielectric constant anisotropy as the liquid crystal, for example, and irradiating with UV rays as an energy source, a liquid crystal panel with vertical alignment can be manufactured without applying an alignment control film. In such a case, it is possible to make the liquid crystal tilt towards a specific direction, if the liquid crystal is made to tilt while the tilting direction is regulated by means of uneven parts formed on the substrate or slits of an electrode or electrodes when voltage is applied.

It is to be noted that since the affinity between alkyl groups is large, regarding all the compounds described-above, it is desirable in many cases in which the hydrophobic, long-chain terminal part has an alkyl group, that the cross-linkable structural part does not have an alkylene structure, or has a short alkylene group, if any, in order not to hinder the rising of the hydrophobic, long-chain terminal part. Accordingly, in such a case, consideration from this viewpoint must be often taken, regarding $R^3$ in formulae (3)-(6) and the length of $CH_2$ units in formulae (7)-(10).

There is no particular limitation to a liquid crystal according to the present invention, and known liquid crystals can be used. For example, MLC-6608 made by Merck & Co., Inc. can be used.

In a method for manufacturing a liquid crystal panel according to the present invention, a resin composition comprising one or more first compounds having a cross-linkable structural part and a hydrophobic, long-chain terminal part sandwiched between a pair of substrates is cross-linked in the presence of a liquid crystal to form the liquid crystal layer, so that the cross-linked resin has an adhered, cross-linked structural part and hydrophobic, long-chain terminal parts in the liquid crystal layer thus formed. It is preferable to have a structure in which the hydrophobic, long-chain terminal parts rise from the liquid crystal layer contacting surface.

Figure 8:
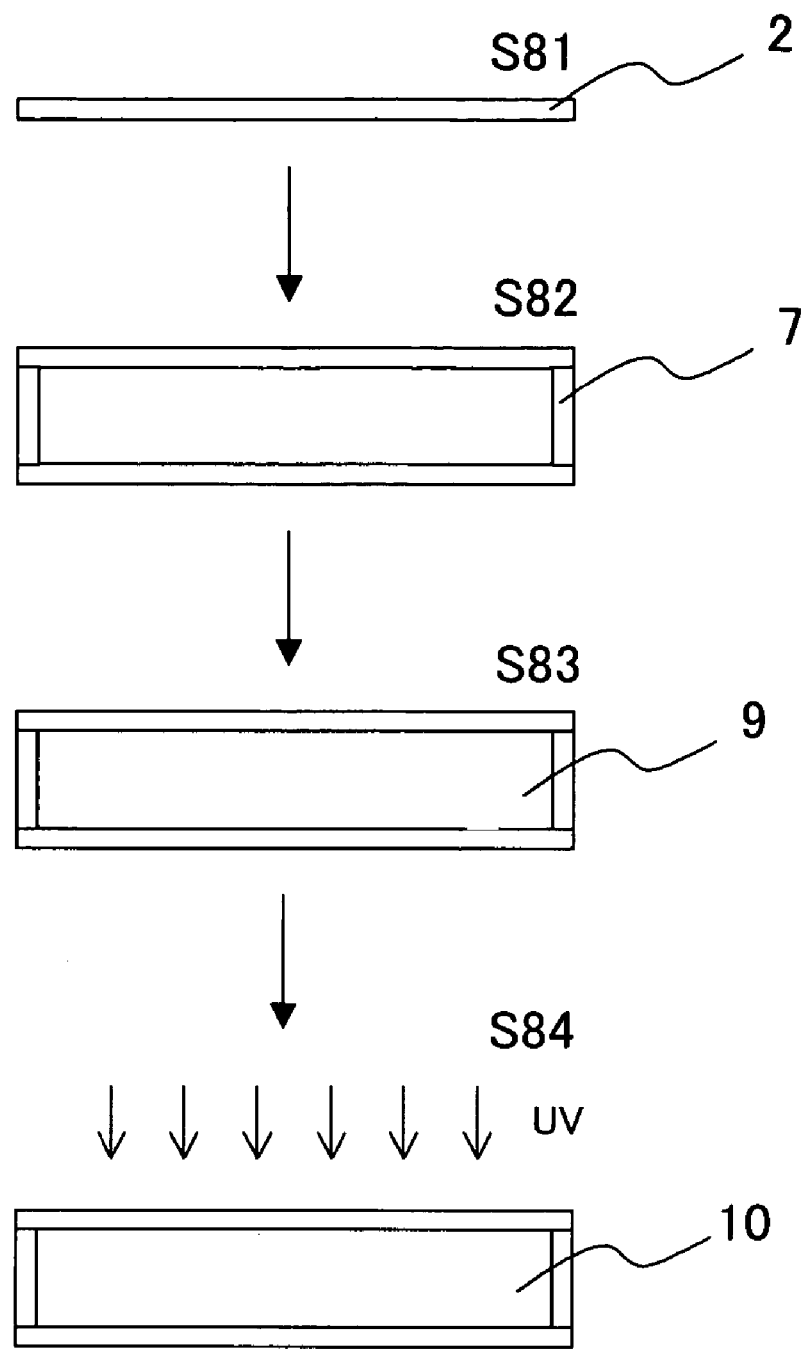
FIG. 8 is a flow chart showing an outline of a method for manufacturing a liquid crystal display panel according to the present invention.

FIG. 8 illustrates a method for manufacturing a liquid crystal panel according to the present invention. From the top of FIG. 8 to the bottom, first, two substrates 2 without alignment control films thereon are prepared according to step S81, they are bonded together according to step S82, an uncured liquid crystal composition 9 comprising a liquid crystal and a resin composition is then introduced according to step S83, and UV rays are irradiated to form a liquid crystal display panel with a liquid crystal layer 10 comprising the liquid crystal and a cross-linked resin according to step S84. The liquid crystal layer 10 is sealed with substrates 2 and a sealant 7. For the introduction of the liquid crystal composition, a titration method contributes more than a vacuum introduction method to the simplification of the processes and the cost decrease. Also, compared with the vacuum introduction process, more versatile selection of liquid crystals is possible, leadings to improved vertical alignment.

In order to make the cross-linked resin have an adhered, cross-linked structural part and hydrophobic, long-chain terminal parts, and to have a structure in which the hydrophobic, long-chain terminal parts rise from the liquid crystal layer contacting surface in the formed liquid crystal layer, it is possible to appropriately choose a liquid crystal, one or more first compound having a cross-linkable, structural part and a hydrophobic, long-chain terminal part, combinations with other coexisting materials, concentration thereof, cross-linking reaction temperature, cross-linking means, the intensity of energy to be given, etc. The rate of the resin composition in the liquid crystal layer, that is, the concentration of the resin composition in the uncured liquid crystal composition comprising the resin composition and the liquid crystal, is preferably 0.1-10% by weight. The amount of the hydrophobic, long-chain terminal part is preferably in the range of from 50 to 95 moles, based on 100 moles of the first compound(s). In this way, an appropriate ratio of an adhered, cross-linked structural part to rising terminal parts can be realized. It is to be noted that the range of from 50 to 95 moles of the hydrophobic, long-chain terminal part based on 100 moles of the first compound(s) means that the ratio is 50-95 units of the hydrophobic, long-chain terminal part based on 100 molecules of the mixture, when the first compounds(s) is a mixture of a compound having a cross-linkable structural part and a compound having a hydrophobic, long-chain terminal part as described above.

It goes without saying that it is also possible to apply the aspects of the above-described liquid crystal panel according to the present invention to the method for manufacturing a liquid crystal panel according to the present invention, regarding the liquid crystal, hydrophobic, long-chain terminal part, adhered, cross-linked structural part, polar-group structural part, cross-linking, cross-linkable structural part, cross-liked resin, resin composition, first compound(s), second compound, third compound, uneven parts, slits of an electrode or electrodes, alignment control film, etc.

A liquid crystal panel according to the present invention can align the liquid crystal vertically without an alignment control film when no voltage is applied. However, it is also acceptable to install an alignment control film.

By a method for manufacturing a liquid crystal panel according to the present invention, simplified facilities and simplified processes are realized by virtue of disuse of a printing machine for forming an alignment control film, baking furnace, etc. In this way, a lot of advantages including improved qualities of a liquid crystal panel, improved yield, low cost, etc. are realized. In addition, requirement to superjumboization of mother glass for substrates of liquid crystal panels can be easily met.

The present invention is particularly useful when applied to a liquid crystal panel in which the liquid crystal has an negative dielectric constant anisotropy, is almost vertically aligned when no voltage is applied, and is tilted while the tilting direction is regulated by uneven parts formed on the substrate or slits of an electrode or electrodes, when voltage is applied.

A liquid crystal panel according to the present invention can be utilized for a liquid crystal display apparatus, most typically, such as a display apparatus for a personal computer and a television receiver, by attaching drive units, etc. It goes without saying that the liquid crystal panel can be utilized for any other applications where the function to control the manner of light transmission by means of a liquid crystal is needed. For example, liquid crystal shutters, liquid crystal projectors and liquid crystal viewfinders are enumerated.

EXAMPLES

Examples and comparative examples for the present invention follow below.

Example 1

Two glass substrates with ITO (indium-tin oxide) thereon as electrodes were bonded together without forming an alignment control film to form an evaluation cell having a cell thickness of 4.25 μm. The surface of the evaluation cell thus prepared was irradiated with UV rays at 1,500 mJ/cm² for a treatment to make the cell surface hydrophilic.

Next, a monomer represented by formula (20) below was manufactured. To 100 parts by weight of a liquid crystal (liquid crystal A) made by Merck & Co., Inc. and having a negative dielectric constant anisotropy, 0.5 parts by weight of this monomer and 0.1 part by weight of Irg. 651 (Irgacure 651 made by Ciba Specialty Chemicals) were added. The mixture was introduced into the evaluation cell followed by sealing. $R^{51}$ part of formula (20) was an alkyl group. Here, $C_{12}H_{25}$ was used.

The monomer represented by formula (20) corresponds to the first compound(s) having a cross-linkable structural part and a hydrophobic, long-chain terminal part.

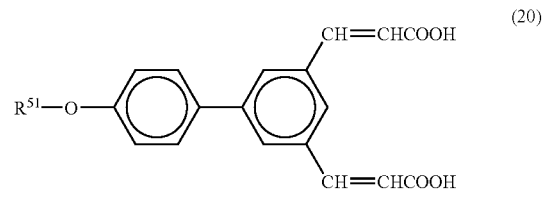

(20)

The alignment state of the evaluation cell immediately after this was observed. When, no voltage was applied, mobile alignment was seen, showing a state where horizontal alignment and vertical alignment were existing together.

After that, the evaluation cell was annealed at 90° C. for half an hour for the purpose of erasing the mobile alignment, etc., cooled, irradiated with nonpolarized UV rays at 300 mJ/cm² to cross-link the monomer, and the alignment was observed. When no voltage was applied, completely vertical alignment was provided all over the evaluation cell.

Comparative Example 1

The same experiment as for EXAMPLE 1 was conducted except that instead of the monomer represented by formula (20), lauryl acrylate, $CH_2=CHCOOC_{12}H_{25}$ was used in the same amount.

As a result, almost no change in alignment was observed before and after the UV irradiation, and no good vertical alignment was obtained when no voltage was applied.

Next, to 100 parts by weight of the liquid crystal, 1.5 parts by weight of the monomer and 0.1 part by weight of Irg. 651 as a polymerization initiator were added, and UV irradiation was performed. However, it was not possible to obtain vertical alignment all over the cell when no voltage was applied.

Example 2

The same experiment as for EXAMPLE 1 was conducted except that instead of the monomer represented by formula (20), lauryl acrylate, $CH_2=CHCOOC_{12}H_{25}$ was used in the same amount, and a second compound represented by formula (21) with a cross-linkable structural part and without a hydrophobic, long-chain terminal part in an amount of 0.15 parts by weight based on 100 parts by weight of the liquid crystal were used. In this case, it is possible to consider that lauryl acrylate had the hydrophobic, long-chain terminal part.

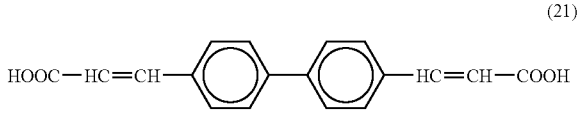
(21)

Figure 9B:
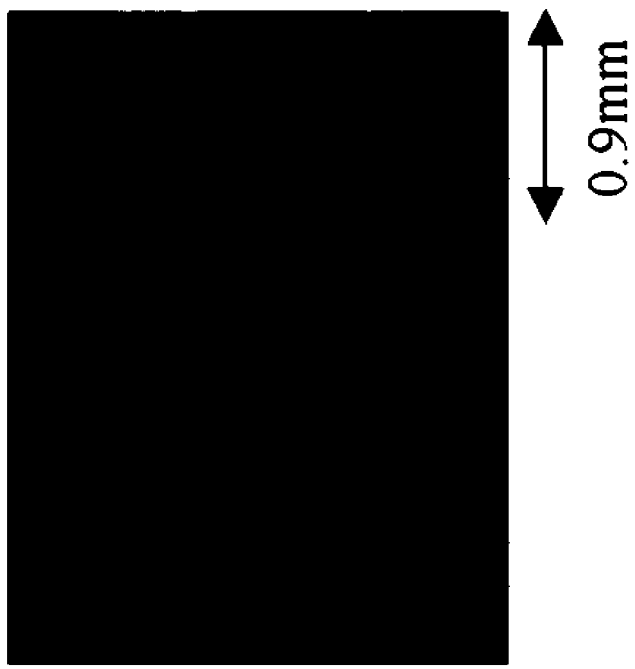
FIG. 9B is another photomicrographs of a TFT liquid crystal panel using crossed nicols.
Figure 9A:
FIG. 9A is a photomicrograph of a TFT liquid crystal panel using crossed nicols.

As a result, when no voltage was applied, vertical alignment was realized all over the cell. However, as a result of a microscopic observation using crossed nicols of a TFT liquid crystal panel having an MVA structure shown in FIGS. 1 and 2 to which this example was applied, white line defects (parts where the alignment was insufficient) as shown in FIG. 9A were found. These white line defects can be a cause to give a coarse image. Such defects could be prevented by regulating the amount of the compound represented by formula (21), and a display surface without defects as shown in FIG. 9B was observed.

Example 3

The same experiment as for EXAMPLE 1 was conducted except that instead of the monomer represented by formula (20), a monomer represented by formula (20)-1 was used.

As a result, though almost no change in alignment was observed before and after the UV irradiation when only UV irradiation was applied, vertical alignment was realized all over the cell when 0.1 part by weight of Irg. 651 was added as a polymerization initiator based on 100 parts by weight of the liquid crystal, followed by UV irration. However, the liquid crystal was slightly tilted, and grayish domains remained partly.

Hereupon, the monomer represented by formula (21) was added in the same way as in the case of EXAMPLE 2. As a result, complete vertical alignment as shown in FIG. 9B was observed all over the MVA panel. Also no trouble was observed in the switching performance in the director direction at the time of liquid crystal driving.

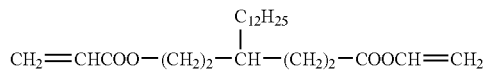
(20)-1

Example 4

Experiments similar to EXAMPLE 1 were performed in which the length of the alkyl group of $R^{51}$ was changed so as to see the change of the alignment behavior.

Significant vertical alignment was observed when the alkyl group was longer than $C_6H_{13}$ (6 carbons). Significant vertical alignment was observed, particularly when the number of carbon was on the order of 7-8 for those having a benzene ring introduced. Regarding a simple alkyl group, significant vertical alignment was observed when the number of carbon was on the order of 10-12.

On the other hand, when the carbon number exceeded 18 ($C_{18}CH_{37}$), the level of vertical alignment tended to decline, perhaps owing to the fact that the alkyl group was folded and did not form a straight chain. When the number exceeded about 18, fluctuation in alignment was observed, perhaps owing to the monomer concentration distribution.

Comparative Example 2

The same experiment as for EXAMPLE 1 was conducted and an evaluation cell was prepared except that stearyltrichlorosilane $CH_3(CH_2)_{17}SiCl_3$, a material that can be chemically bonded to a hydroxy group on the substrate surface, was added in an amount of 2.0 parts by weight based on 100 parts by weight of the liquid crystal, as a model experiment to see the effect of a polar-group structural part having impurity ions. As a result, vertical alignment was possible, but the voltage maintaining rate of the cell was zero, and the cell was in the electroconductive state. It was found that $H^+$ and $Cl^-$ were eluted out into the liquid crystal as impurities. In the same manner, all materials having ionic, hydrophilic end groups, such as SDS (sodium dodecyl sulfate) and CTAB (cetyltrimethylammonium bromide) emitted ionic impurities into the liquid crystal, so that the retention rate was far below the level (about 97% or higher) at which TFT driving was possible.

Example 5

A monomer represented by formula (20) and $CH_2\!=\!CHCOO(CH_2)_{11}OCOCH\!=\!CH_2$, a bifunctional monomer having an alkylene skeleton, were mixed at a molar ratio of 20:1. The mixture in an amount of 0.5 parts by weight was dissolved into 100 parts by weight of liquid crystal A. This mixture was introduced into an evaluation cell that had been treated in the same way as in EXAMPLE 1, followed by sealing. Here, $C_{18}CH_{37}$ was used for $R^{51}$ of the monomer represented by formula (20), and Irg. 651 in an amount of 0.1 part by weight was added, as an initiator, to 100 parts by weight of the liquid crystal.

When the state of the alignment was observed after an annealing treatment at 90° C. for half an hour, vertical alignment was seen partly, for example at the ITO electrodes, etc. Then, nonpolarized UV irradiation was performed at 300 mJ/cm². In the observation after the irradiation, vertical alignment was seen when no voltage was applied. However, a state completely without defects as shown in FIG. 9B could not be achieved.

Example 6

A mixture obtained by mixing a monomer represented by formula (22) and a monomer represented by formula (21) and a mixture obtained by mixing a monomer represented by formula (23) and a monomer represented by formula (21), at a molar ratio of 20:1, respectively, were dissolved in an amount of 0.4 parts by weight, respectively, into 100 parts by weight of liquid crystal A. These mixtures were introduced into evaluation cells that had been treated in the same way as in EXAMPLE 1, followed by sealing. Here, $R^{81}$ of formula (22) and $R^{91}$ of formula (23) are both an alkyl group. $C_{12}H_{25}$ was used, here. Irg. 651 in an amount of 0.1 part by weight was added, as an initiator, to 100 parts by weight of liquid crystal A.

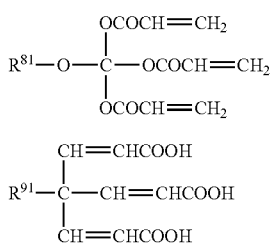

When the state of the alignment of the panel was observed after an annealing treatment at 90° C. for half an hour followed by nonpolarized UV irradiation at 300 mJ/cm², both cells showed good vertical alignment when no voltage was applied.

After the UV irradiation, both cells were disassembled, washed with isopropyl alcohol to remove the liquid crystal, and the substrate surface that had been contacted with the liquid crystal was observed. As a result, it was confirmed that a polymer film was left on the surface. The substrates were reassembled, a liquid crystal was reintroduced, and the state of alignment was observed. A state of vertical alignment that was about the same as the one before the disassembling was observed.

Example 7

Figure 2:
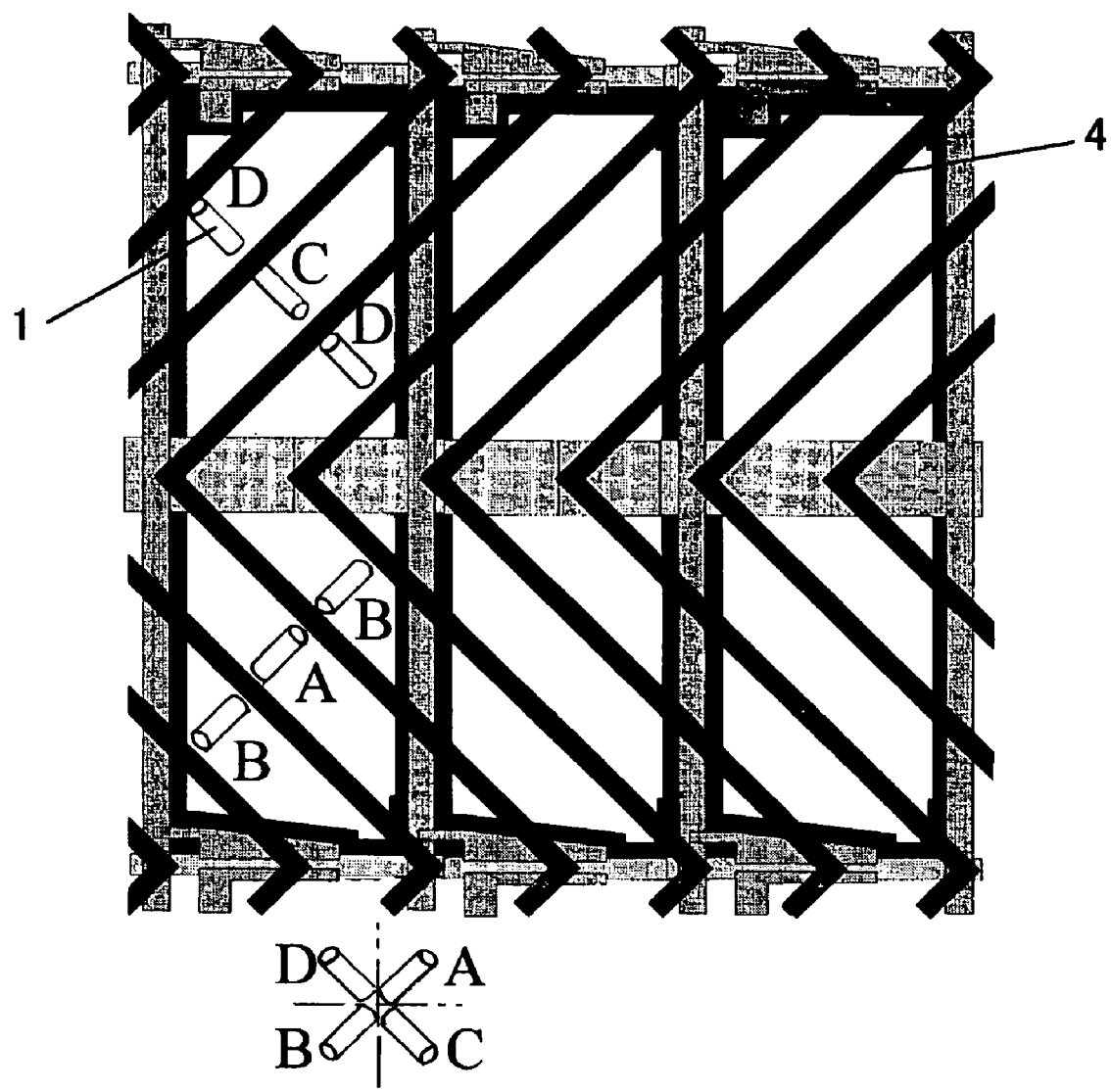
FIG. 2 is a model plan view showing the alignment direction of a liquid crystal in a liquid crystal panel according to the MVA system.

For a TFT liquid crystal panel having an MVA structure as shown in FIGS. 1 and 2, a monomer represented by formula (20)-2 and a monomer represented by formula (21) were mixed at a molar ratio of 20:1. The mixture in an amount of 0.1 part by weight was dissolved into 100 parts by weight of liquid crystal A. This mixture was introduced into an evaluation cell that had been treated in the same way as in EXAMPLE 1, followed by sealing. Here, $C_{12}H_{25}$ was used for $R^{52}$, and Irg. 651 in an amount of 0.1 part by weight was added, as an initiator, to 100 parts by weight of the liquid crystal.

When the state of the alignment of the panel was observed after an annealing treatment at 90° C. for half an hour followed by nonpolarized UV irradiation at 300 mJ/cm², black luminance on the same level as that of a conventional MVA panel could be obtained at no voltage application. Also no trouble was observed in the switching performance in the director direction at the time of liquid crystal driving.

Similar results were obtained when slits of the electrode were applied instead of the uneven parts on the TFT side, and similar experiments were conducted.

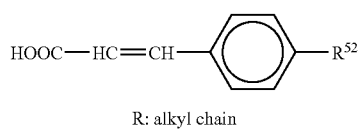

R: alkyl chain

Example 8

A seal pattern was formed on one of cleaned glass substrates, using a thermosetting sealant made by Mitsui Chemicals, Inc., and spacers (made by Sekisui Fine Chemicals Co., Ltd.) having a particle diameter of 4 μm were scattered by a wet scattering method onto the other substrate, using ethanol. The substrates were bonded together, followed by vacuum packing and baking at 135° C. to form a blank panel.

As a second compound according to the present invention with a cross-linkable structural part and substantially without a hydrophobic, long-chain terminal part, a compound represented by formula (24) was used, as a third compound with a hydrophobic long-chain terminal part and with one polymerizable group, a compound represented by formula (25) was used, and they were mixed together.

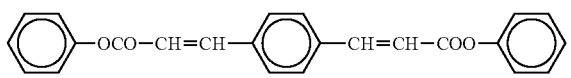

$$CH_2=CHCOO\cdot C_{12}H_{25} \qquad (25)$$

The molar ratio of the mixture, that is, the molar ratio of the compound represented by formula (24): the compound represented by formula (25)=1:15. Two parts by weight of the mixture was mixed with 100 parts by weight of liquid crystal A. Furthermore, 0.1 part by weight of Irg. 184 (Irgacure 184) as a polymerization initiator was mixed, based on 100 parts by weight of the liquid crystal.

After the mixture was introduced into the blank panel, UV irradiation was performed to form a liquid crystal display panel. UV was irradiated at 10 mW/cm² for one minute at room temperature. Before the UV irradition, horizontal alignment was observed when no voltage was applied. However, after the UV irration, uniform vertical alignment was observed.

Example 9

The same experiment as for EXAMPLE 8 was conducted to form a liquid crystal display panel, except that a monomer represented by formula (26) was used as a second compound. By applying UV irradition, uniform vertical alignment was observed at no voltage application.

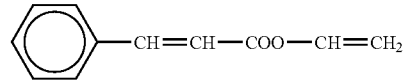

Example 10

The same experiment as for EXAMPLE 8 was conducted to form a liquid crystal display panel, except that a monomer represented by formula (27) was used as a second compound. By applying UV irradiation, uniform vertical alignment was observed at no voltage application.

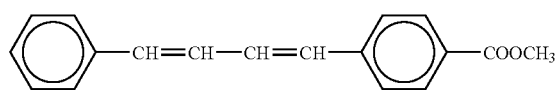

Example 11

The same experiment as for EXAMPLE 8 was conducted to form a liquid crystal display panel, except that a monomer represented by formula (28) was used as a second compound. By applying UV irradiation, uniform vertical alignment was observed at no voltage application.

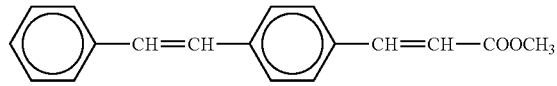

(28)

Example 12

The same experiment as for EXAMPLE 8 was conducted to form a liquid crystal display panel, except that a monomer represented by formula (29) was used as a second compound. By applying UV irradiation, uniform vertical alignment was observed at no voltage application.

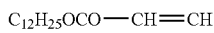

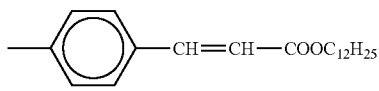

(29)

Example 13

The same experiment as for EXAMPLE 8 was conducted to form a liquid crystal display panel, except that a monomer represented by formula (30) was used as a second compound. By applying UV irradiation, uniform vertical alignment was observed at no voltage application.

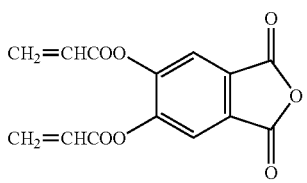

(30)

Example 14

The same experiment as for EXAMPLE 8 was conducted to form a liquid crystal display panel, except that a monomer represented by formula (31) was used as a second compound. By applying UV irradiation, uniform vertical alignment was observed at no voltage application.

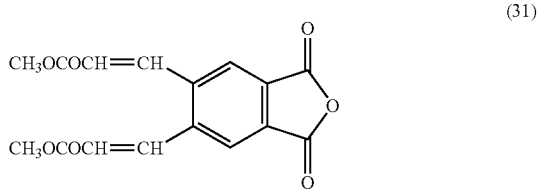

(31)

Example 15

The same experiment as for EXAMPLE 8 was conducted to form a liquid crystal display panel, except that a monomer represented by formula (32) was used as a second compound. By applying UV irradiation, uniform vertical alignment was observed at no voltage application.

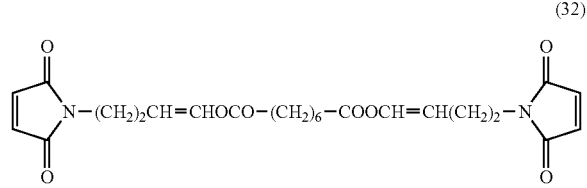

(32)

Example 16

The same experiment as for EXAMPLE 8 was conducted to form a liquid crystal display panel, except that at monomer represented by formula (33) was used as a second compound. By applying UV irradiation, uniform vertical alignment was observed at no voltage application.

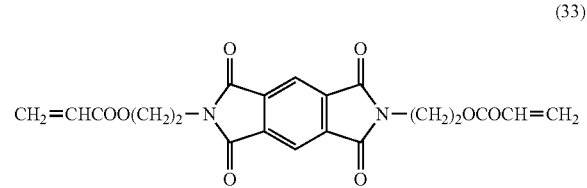

(33)

Example 17

The same experiment as for EXAMPLE 8 was conducted to form a liquid crystal display panel, except that monomers represented by formula (34) were used as a second compound. By applying UV irradiation, uniform vertical alignment was observed at no voltage application.

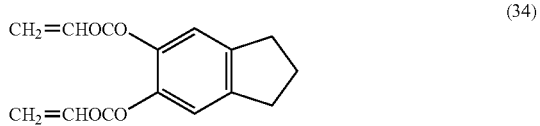

(34)

-continued

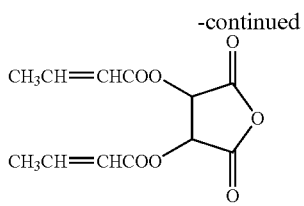

Example 18

The same experiment as for EXAMPLE 8 was conducted to form a liquid crystal display panel, except that a monomer represented by formula (35) was used as a second compound. By applying UV irradiation, uniform vertical alignment was observed at no voltage application.

$$CH_2=CHCOO-(CH_2)_{10}-OCOCH=CH_2 \quad (35)$$

However, when a voltage of 10V, 30 Hz was applied to the liquid crystal panel for one hour, some white lines were observed on the display surface after the voltage application ceased.

It is thought that the reason was that the network structure from this monomer was soft, and as a result, the alignment disorder generated by the voltage application tended to remain after the voltage application ceased.

What is claimed is:

1. A liquid crystal panel having a liquid crystal layer sandwiched between a pair of substrates wherein:
   said liquid crystal layer comprises a liquid crystal and a cross-linked resin; and
   said cross-linked resin comprises a cross-linked structural part adhered to a liquid crystal layer contacting surface (adhered, cross-linked structural part) and a terminal part rising from the liquid crystal layer contacting surface (rising terminal part).

2. A liquid crystal panel according to claim 1, wherein said liquid crystal layer is formed by cross-linking, in the presence of a liquid crystal, a resin composition comprising one or more first compounds having a cross-linkable structural part, and a hydrophobic terminal part with a straight-chain section having three or more carbon atoms (hydrophobic, long-chain terminal part).

3. A liquid crystal panel according to claim 2, wherein the cross-linkable structural part of said first compound or compounds comprises a polar-group structural part.

4. A liquid crystal panel according to claim 3, wherein said polar-group structural part does not generate impurity ions.

5. A liquid crystal panel according to claim 2, wherein said resin composition in the liquid crystal layer is in the range of from 0.1 to 10% by weight.

6. A liquid crystal panel according to claim 2, wherein said hydrophobic, long-chain terminal part is in the range of from 50 to 95 moles based on 100 moles of the first compound or compounds.

7. A liquid crystal panel according to claim 1, wherein said liquid crystal has a negative dielectric constant anisotropy.

8. A liquid crystal panel according to claim 2, wherein said hydrophobic, long-chain terminal part has an alkyl or alkoxy group having from 6 to 18 carbon atoms.

9. A liquid crystal panel according to claim 2, wherein said cross-linkable structural part of the first compound or compounds has two or more polymerizable double bonds per molecule.

10. A liquid crystal panel according to claim 2, wherein at least one compound represented by formula (1) or (2) below is included as the first compound or compounds,

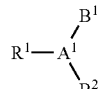 (1)

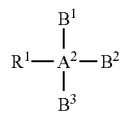 (2)

(in formulae (1) and (2), $R^1$ is a hydrophobic, long-chain terminal part; $A^1$ is a trivalent group comprising an aliphatic chain that may be branched, an aromatic ring that may have a substituting group, an alicyclic ring that may have a substituting group, or nitrogen; $A^2$ is a tetravalent group comprising an aliphatic chain that may be branched, an aromatic ring that may have a substituting group, or an alicyclic ring that may have a substituting group; $B^1$, $B^2$ and $B^3$ are, each, a cross-linkable structural part; and $R^1$, $B^1$, $B^2$ and $B^3$ can be selected independently from each other).

11. A liquid crystal panel according to claim 2, wherein said cross-linkable structural part of the first compound or compounds contains at least one benzene ring structure bonded to a polymerizable group directly or via a carbon atom.

12. A liquid crystal panel according to claim 2, wherein said one or more first compounds comprise a second compound with a cross-linkable structural part and substantially without a hydrophobic, long-chain terminal part.

13. A liquid crystal panel according to claim 12, wherein said second compound comprises at least one aromatic ring and at least one carbonyl group, respectively.

14. A liquid crystal panel according to claim 13, wherein at least one compound selected from the group consisting of the compounds represented by formulae (3) to (6) below is included as the second compound,

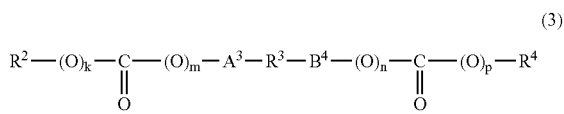 (3)

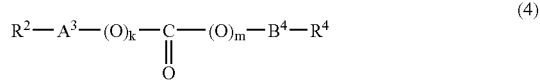 (4)

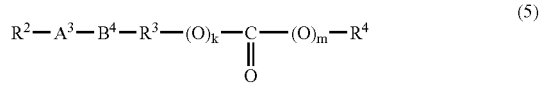 (5)

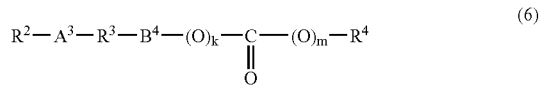 (6)

(in formulae (3) to (6), $A^3$ and $B^4$ are, independently from each other, a vinylene group or a propenylene group; $R^3$ is a divalent group; $R^2$ and $R^4$ are, independently from each other, hydrogen, an alkyl group that may be branched or an aromatic ring that may be substituted; at least one of $R^2$, $R^3$ and $R^4$ is an aromatic ring; k, m, n and p are, independently from each other, 0 (zero) or 1; and $R^2$-$R^4$, $A^3$, $B^4$, k, m, n and p can be selected independently from each other).

15. A liquid crystal panel according to claim 12, wherein said second compound comprises a five-member ring structure.

16. A liquid crystal panel according to claim 15, wherein said five-member ring structure in the second compound is an acid anhydride structure or an imide structure.

17. A liquid crystal panel according to claim 15, wherein at least one compound selected from the group consisting of the compounds represented by formulae (7) to (10) below is included as the second compound,

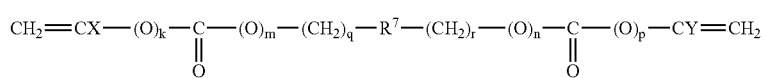

(7)

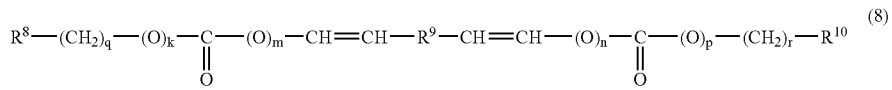

(8)

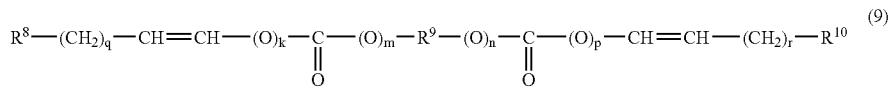

(9)

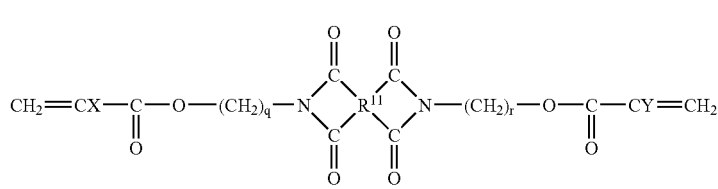

(10)

(in formulae (7) to (10), X and Y are, each independently, hydrogen or a methyl group; $R^7$ is a divalent organic group having a five-member ring structure; $R^8$ and $R^{10}$ are hydrogen or an organic group; $R^9$ is a divalent organic group; at least one of $R^8$, $R^9$ and $R^{10}$ has a five-member ring structure; $R^{11}$ is a tetravalent organic group constituting a tetracarboxylic acid residue; k, m, n and p are, independently from each other, 0 (zero) or 1; q and r are, independently from each other, an integer not less than 0 (zero) and not more than 6; and $R^8$-$R^{10}$, k, m, n, p, q and r can be selected independently from each other).

18. A liquid crystal panel according to one of claims 1 to 17, wherein said liquid crystal tilts while the tilting direction is regulated by uneven parts or slits of an electrode or electrodes when voltage is applied.

19. A method for manufacturing a liquid crystal panel having a liquid crystal layer sandwiched between a pair of substrates, wherein a resin composition comprising one or more first compounds having a cross-linkable structural part and a hydrophobic terminal part with a straight-chain section having three or more carbon atoms (hydrophobic, long-chain terminal part), is cross-linked in the presence of a liquid crystal to form the liquid crystal layer, so that a cross-linked resin in the liquid crystal layer thus formed is made to comprise a cross-linked structural part adhered to a liquid crystal layer contacting surface (adhered, cross-linked structural part) and a terminal part rising from the liquid crystal layer contacting surface (rising terminal part).

20. A method for manufacturing a liquid crystal panel according to claim 19, wherein said cross-linkable structural part of the first compound or compounds comprises a polar-group structural part.

21. A method for manufacturing a liquid crystal panel according to claim 20, wherein said polar-group structural part does not generate impurity ions.

22. A method for manufacturing a liquid crystal panel according to claim 19, wherein said resin composition in the liquid crystal layer is in the range of from 0.1 to 10% by weight.

23. A method for manufacturing a liquid crystal panel according to claim 19, wherein said hydrophobic, long-chain terminal part is in the range of from 50 to 95 moles based on 100 moles of the first compound or compounds.

24. A method for manufacturing a liquid crystal panel according to claim 19, wherein said liquid crystal has a negative dielectric constant anisotropy.

25. A method for manufacturing a liquid crystal panel according to claim 19, wherein said cross-linking is performed by an active energy ray.

26. A method for manufacturing a liquid crystal panel according to claim 19, wherein said hydrophobic, long-chain, terminal part has an alkyl or alkoxy group having from 6 to 18 carbon atoms.

27. A method for manufacturing a liquid crystal panel according to claim 19, wherein said cross-linkable structural part of the first compound or compounds has two or more polymerizable double bonds per molecule.

28. A method for manufacturing a liquid crystal panel according to claim 19, wherein at least one compound represented by formula (1) or (2) below is included as the first compound or compounds,

(1)

-continued

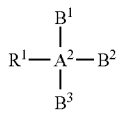
(2)

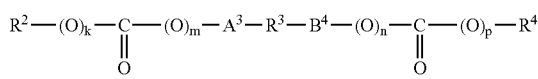
(3)

(in formulae (1) and (2), $R^1$ is a hydrophobic, long-chain terminal part; $A^1$ is a trivalent group comprising an aliphatic chain that may be branched, an aromatic ring that may have a substituting group, an alicyclic ring that may have a substituting group, or nitrogen; $A^2$ is a tetravalent group comprising an aliphatic chain that may be branched, an aromatic ring that may have a substituting group, or an alicyclic ring that may have a substituting group; $B^1$, $B^2$ and $B^3$ are, each, a cross-linkable structural part; and $R^1$, $B^1$, $B^2$ and $B^3$ can be selected independently from each other).

29. A method for manufacturing a liquid crystal panel according to claim 19, wherein said cross-linkable structural part of the first compound or compounds contains at least one benzene ring structure bonded to a polymerizable group directly or via a carbon atom.

30. A method for manufacturing a liquid crystal panel according to claim 19, wherein said one or more first compounds comprise a second compound with a cross-linkable structural part and substantially without a hydrophobic, long-chain terminal part.

31. A method for manufacturing a liquid crystal panel according to claim 30, wherein said second compound comprises at least one aromatic ring and at least one carbonyl group, respectively.

32. A method for manufacturing a liquid crystal panel according to claim 31, wherein at least one compound selected from the group consisting of the compounds represented by formulae (3) to (6) below is included as the second compound,

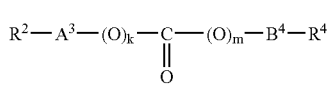
(4)

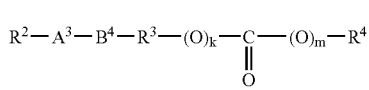
(5)

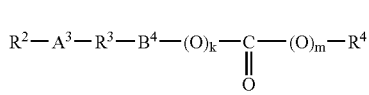
(6)

(in formulae (3) to (6), $A^3$ and $B^4$ are, independently from each other, a vinylene group or a propenylene group; $R^3$ is a divalent group; $R^2$ and $R^4$ are, independently from each other, hydrogen, an alkyl group that may be branched or an aromatic ring that may be substituted; at least one of $R^2$, $R^3$ and $R^4$ is an aromatic ring; k, m, n and p are, independently from each other, 0 (zero) or 1; and $R^2$-$R^4$, $A^3$, $B^4$, k, m, n and p can be selected independently from each other).

33. A method for manufacturing a liquid crystal panel according to claim 30, wherein said second compound comprises a five-member ring structure.

34. A method for manufacturing a liquid crystal panel according to claim 33, wherein said five-member ring structure in the second compound is an acid anhydride structure or an imide structure.

35. A method for manufacturing a liquid crystal panel according to claim 33, wherein at least one compound selected from the group consisting of the compounds represented by formulae (7) to (10) below is included as the second compound,

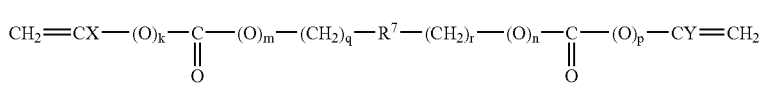
(7)

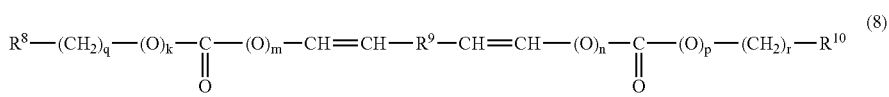
(8)

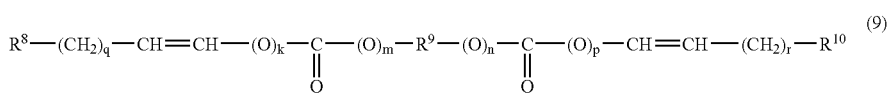
(9)

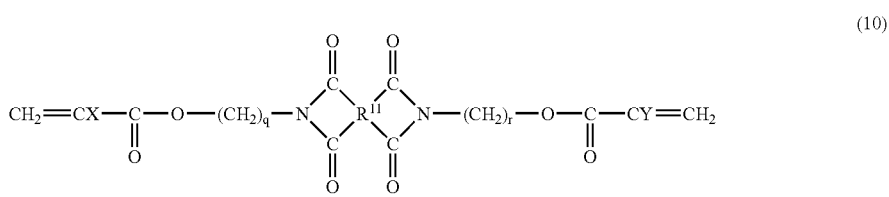
(10)

(in formulae (7) to (10), X and Y are, each independently, hydrogen or a methyl group; $R^7$ is a divalent organic group having a five-member ring structure; $R^8$ and $R^{10}$ are hydrogen or an organic group; $R^9$ is a divalent organic group; at least one of $R^8$, $R^9$ and $R^{10}$ has a five-member ring structure; $R^{11}$ is a tetravalent organic group constituting a tetracarboxylic acid residue; k, m, n and p are, independently from each other, 0 (zero) or 1; q and r are, independently from each other, an integer not less than 0 (zero) and not more than 6; and $R^8$-$R^{10}$, k, m, n, p, q and r can be selected independently from each other).

36. A liquid crystal panel according to claim 1, wherein:
said adhered, cross-linked structural part is a chemical structure constituting an end section or an intermediate section of a molecule; and
said rising terminal part is a chemical structure constituting the end section of a molecule.

37. The method for manufacturing a liquid crystal panel according to claim 19, wherein:
said adhered, cross-linked structural part is a chemical structure constituting an end section or an intermediate section of a molecule; and
said rising terminal part is a chemical structure constituting the end section of a molecule.

* * * * *

UNITED STATES PATENT AND TRADEMARK OFFICE
CERTIFICATE OF CORRECTION

PATENT NO. : 7,501,166 B2  
APPLICATION NO. : 10/806042  
DATED : March 10, 2009  
INVENTOR(S) : Kataoka et al.

Page 1 of 1

It is certified that error appears in the above-identified patent and that said Letters Patent is hereby corrected as shown below:

<u>On the Face of the Patent</u>:

Column 1, beneath:

(73) Assignee:

(*) Notice:      Please indent and insert:

--This patent is subject to a terminal disclaimer.--

Signed and Sealed this

Sixteenth Day of June, 2009

JOHN DOLL  
*Acting Director of the United States Patent and Trademark Office*